United States Patent
Hamada

(10) Patent No.: US 9,369,631 B2
(45) Date of Patent: Jun. 14, 2016

(54) DIGITAL PHOTOGRAPHING APPARATUS HAVING FIRST AND SECOND RECORDING MODES AND METHOD FOR CONTROLLING THE SAME

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 13/206,667

(22) Filed: Aug. 10, 2011

(65) Prior Publication Data

US 2012/0050556 A1  Mar. 1, 2012

(30) Foreign Application Priority Data

Aug. 30, 2010  (KR) .................. 10-2010-0084181

(51) Int. Cl.
*H04N 5/225* (2006.01)
*H04N 5/232* (2006.01)

(52) U.S. Cl.
CPC ....... *H04N 5/23293* (2013.01); *H04N 5/23212* (2013.01); *H04N 5/23245* (2013.01)

(58) Field of Classification Search
CPC ................................................. H04N 5/23245
USPC ...................................................... 348/220.1
See application file for complete search history.

(56) References Cited

U.S. PATENT DOCUMENTS

| | | | | |
|---|---|---|---|---|
| 4,937,673 A | * | 6/1990 | Saito et al. | 348/64 |
| 5,990,937 A | * | 11/1999 | Masayoshi | 348/64 |
| 2003/0184674 A1 | * | 10/2003 | Manico et al. | 348/375 |
| 2003/0193578 A1 | | 10/2003 | Parulski et al. | |
| 2004/0136685 A1 | | 7/2004 | Ota et al. | |
| 2004/0201715 A1 | * | 10/2004 | Ishimura et al. | 348/220.1 |
| 2005/0200718 A1 | * | 9/2005 | Lee | 348/220.1 |
| 2006/0209197 A1 | * | 9/2006 | Vanhatalo | 348/239 |
| 2006/0215039 A1 | | 9/2006 | Kobayashi | |
| 2008/0144906 A1 | * | 6/2008 | Allred | A61B 5/0059 382/131 |

FOREIGN PATENT DOCUMENTS

| | | |
|---|---|---|
| EP | 1 998 334 B1 | 4/2014 |
| JP | 07-015693 A | 1/1995 |
| JP | 2000-069428 A | 3/2000 |
| JP | 2004-004362 A | 1/2004 |
| JP | 2004-032690 A | 1/2004 |
| JP | 2005-057361 A | 3/2005 |
| JP | 2008-301357 A | 12/2008 |

OTHER PUBLICATIONS

Office Action issued in related application KR 10-2010-0084181, with English language translation, Apr. 14, 2016, 19 pages.

* cited by examiner

*Primary Examiner* — Usman Khan

(74) *Attorney, Agent, or Firm* — Drinker Biddle & Reath LLP

(57) ABSTRACT

Provided are a digital photographing apparatus and a method of controlling the same. The digital photographing apparatus includes a snap motion picture capturing mode and is capable of capturing a short-time motion picture using the same sequence as capturing of still images by pressing a capture start button.

27 Claims, 22 Drawing Sheets

ID_PHOTOGRAPHING APPARATUS
HAVING FIRST AND SECOND RECORDING
MODES AND METHOD FOR CONTROLLING
THE SAME

CROSS-REFERENCE TO RELATED PATENT
APPLICATION

This application claims the benefit of Korean Patent Application No. 10-2010-0084181, filed on Aug. 30, 2010, in the Korean Intellectual Property Office, the disclosure of which is incorporated herein in its entirety by reference.

BACKGROUND

The present invention relates to a digital photographing apparatus and a method of controlling the same, and more particularly, to a digital photographing apparatus capable of capturing snap motion pictures and a method of controlling the same.

Although cameras capable of capturing motion pictures have been available, captured motion pictures generally feature long playback times. In contrast, an image captured by a still camera may be viewed in a relatively short time. Conventionally, an image captured by a still camera is viewed as a printed picture by using an album or a frame. Furthermore, along with digitization of photography, images are viewed by using a playback device, such as a digital photo frame or a television, and such devices are generally capable of playing back motion pictures.

SUMMARY

Various embodiments of the present invention provide a digital photographing apparatus having a snap motion picture capturing mode and capable of capturing a short-time motion picture using the same sequence as capturing of still images by pressing a capture start button.

According to an embodiment of the present invention, there is provided a digital photographing apparatus including an imaging lens via which light from an object is input; and an imaging device for generating image signals using light passed through the imaging lens, wherein the digital photographing apparatus starts capturing of a motion picture from the image signals according to operation of predetermined switches and completes the capturing of the motion picture after a first period of time has elapsed.

The digital photographing apparatus includes a first photographing mode for capturing a still image from the image signals; and a second photographing mode for capturing the motion picture from the image signals, wherein, in case of the first photographing mode, the still image is captured as the predetermined switches are operated, and in case of the second photographing mode, the capturing of the motion picture is initiated as the predetermined switches are operated and is terminated after a first period of time has elapsed.

The predetermined switches include a first switch and a second switch. A still image is captured from the image signals as the first switch is pressed, the motion picture is captured from the image signals as the second switch is pressed, and the capturing of the motion picture is initiated as the second switch is pressed and is terminated after the first period of time has elapsed.

The digital photographing apparatus further includes a third photographing mode for capturing the motion picture from the image signals, wherein, in the third photographing mode, the capturing of the motion picture is initiated as the first switch is pressed and is terminated as the first switch is pressed again.

If the switch is pressed again during the capturing of the motion picture, the capturing of the motion picture is terminated after the first period of time has elapsed and capturing of a new motion picture is performed for a next first period of time.

If the switch is pressed again during the capturing of the motion picture, the capturing of the motion picture is terminated and capturing of a new motion picture is immediately performed for a next first period of time.

If the switch is pressed again during the capturing of the motion picture, the capturing of the motion picture is terminated after the first period of time has elapsed and capturing of a new motion picture is performed for a second period of time as an extension of the first period of time.

The digital photographing apparatus includes a first recording mode for recording a motion picture corresponding to the first period of time after the switch is pressed; and a second recording mode for recording a motion picture corresponding to the first period of time before the switch is pressed.

I case of the second recording mode, motion pictures are periodically captured continuously for the first period of time after the second recording mode is selected.

The first period of time may be from one second to three minutes.

According to another embodiment of the present invention, there is provided a digital photographing apparatus including an imaging lens via which light from an object is input; an imaging device for generating image signals using light passed through the imaging lens; a still image capture controller for capturing a still image from the image signals; a motion picture capture controller for capturing a motion picture by successively acquiring the image signals; a focus adjusting unit that acquires focus detection evaluation values from the image signals and controls the imaging lens to be located at an in-focus position; and a switch for performing at least one of functions including focus adjustment, still image capture, motion picture capture, and snap motion picture capture, wherein the digital photographing apparatus starts capturing of a snap motion picture from the image signals according to operation of the switches and completes the capturing of the snap motion picture after a first period of time has elapsed.

The switch includes first through third switches. Capturing of the motion picture is initiated as the second switch is pressed, and is terminated as the second switch is pressed again. In case of a first photographing mode, the focus adjustment is performed as the third switch is pressed and capturing of the still image is initiated as the first switch is pressed. In case of a second photographing mode, the focus adjustment is performed as the third switch is pressed and the capturing of the snap motion picture is initiated as the first switch is pressed, and the capturing of the snap motion picture is terminated after the first period of time has elapsed.

The switch includes first through third switches. The focus adjustment is performed as the third switch is pressed, the focus adjustment is terminated and the capturing of the still image is initiated as the first switch is pressed, and the focus adjustment is performed and the capturing of the snap motion picture is initiated as the second switch is pressed, and the capturing of the snap motion picture is terminated after the first period of time has elapsed.

The third switch corresponds to a shutter release switch half-pressed, the first switch corresponds to the shutter release switch fully-pressed, and the second switch corresponds to a motion picture capture switch.

If the switch is pressed again during the capturing of the snap motion picture, the capturing of the snap motion picture is terminated after the first period of time has elapsed and capturing of a new snap motion picture is performed for a next first period of time.

If the switch is pressed again during the capturing of the snap motion picture, the capturing of the snap motion picture is terminated and capturing of a new snap motion picture is immediately performed for a next first period of time.

If the switch is pressed again during the capturing of the snap motion picture, the capturing of the snap motion picture is terminated after the first period of time has elapsed and capturing of a new snap motion picture is performed for a second period of time as an extension of the first period of time.

The digital photographing apparatus includes a first recording mode for recording a snap motion picture corresponding to the first period of time after the switch is pressed; and a second recording mode for recording a snap motion picture corresponding to the first period of time before the switch is pressed.

In case of the second recording mode, snap motion pictures are periodically captured continuously for the first period of time after the second recording mode is selected.

The focus adjustment is performed after the second recording mode is selected.

In the second recording mode, if the switch is pressed again within a predetermined period of time after the capturing of the snap motion picture is terminated, capturing of a next snap motion picture is performed for a next first period of time after the capturing of the snap motion picture is performed from a time point at which the switch is previously pressed.

In the second recording mode, if the switch is pressed again within a predetermined period of time after the capturing of the snap motion picture is initiated, capturing of a next snap motion picture is performed for a next third period of time as an extension of the first period of time until the switch is pressed again.

The predetermined period of time refers to the first period of time.

The third period of time is longer than the first period of time and is shorter than twice the first period of time.

In case of the capturing of the snap motion picture for the first period of time, the first period of time and a portion of the first period of time in which the snap motion picture has already been captured are displayed.

In case of the capturing of the snap motion picture for the first period of time, the focus adjustment is performed while the snap motion picture is being captured.

The first period of time is selectable in a menu of the digital photographing apparatus.

A voice recording option to record a voice during the capturing of the snap motion picture is configurable in a menu of the digital photographing apparatus.

According to another embodiment of the present invention, there is provided a method of controlling a digital photographing apparatus including an imaging lens via which light from an object is input; and an imaging device for generating image signals using light that has passed through the imaging lens, the method including detecting that a predetermined switch is operated; initiating capturing of a motion picture from the image signals according to the operation of the switch; capturing the motion picture for a first period of time; and terminating the capturing of the motion picture after the first period of time has elapsed.

The method further includes detecting that the switch is pressed again while the motion picture is being captured; and terminating the capturing of the motion picture after the first period of time has elapsed and performing capturing of a next motion picture for a next first period of time.

The method further includes detecting that the switch is pressed again while the motion picture is being captured; and terminating the capturing of the motion picture and immediately performing capturing of a motion picture for a next first period of time.

The method further includes detecting that the switch is pressed again while the motion picture is being captured; and terminating the capturing of the motion picture after the first period of time has elapsed and performing an operation of capturing a motion picture for a next third period of time as an extension of the first period of time until the switch is pressed again.

The method further includes performing focus adjustment while the motion picture is being captured.

The first period of time may be from one second to three minutes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will be described in detail by explaining preferred embodiments of the invention with reference to the attached drawings.

Figure 1:
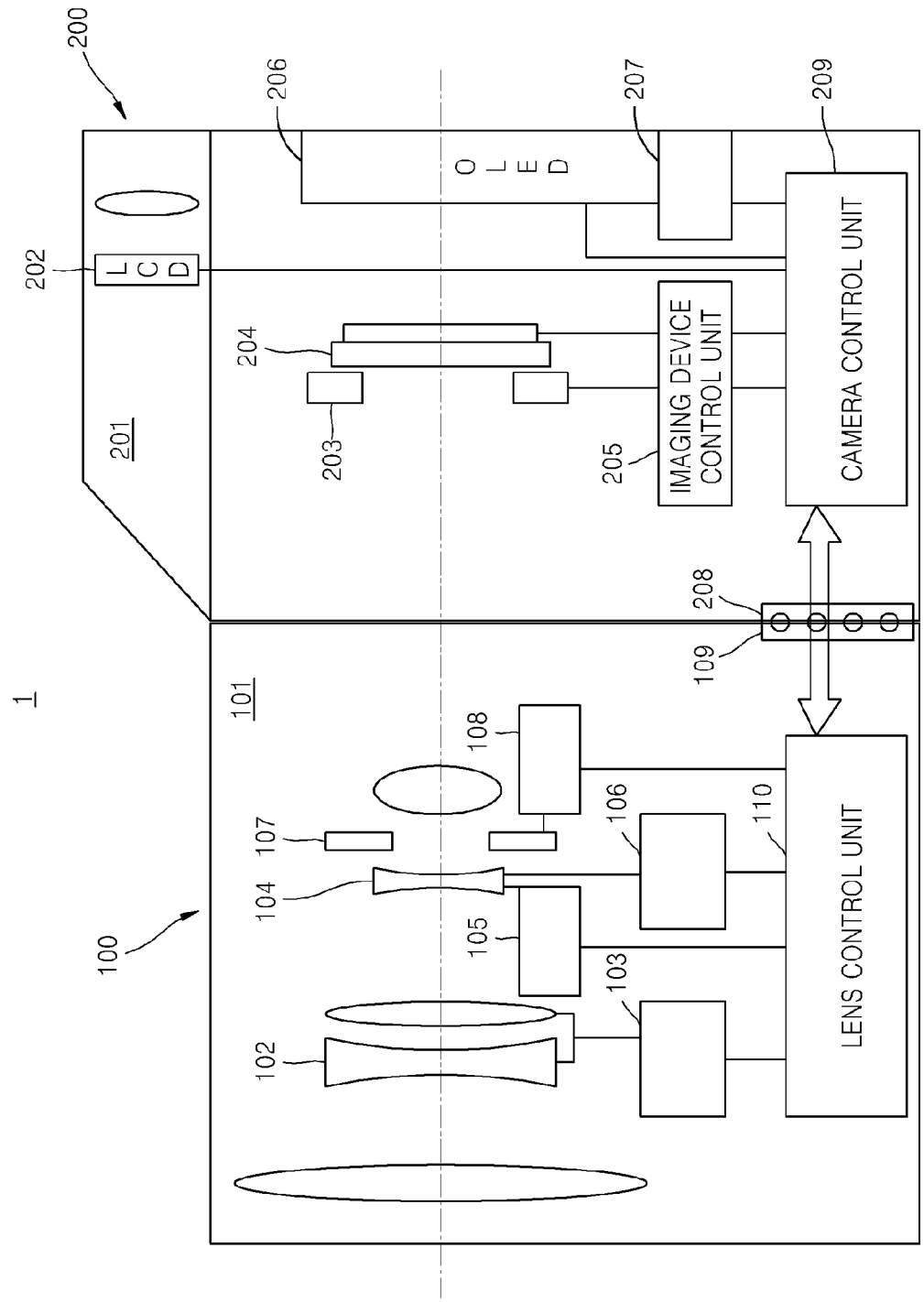
FIG. 1 is a block pictorial diagram of a lens-exchangeable digital photographing apparatus according to an embodiment of the present invention.

FIG. 1 is a diagram of a lens-exchangeable digital photographing apparatus 1 according to an embodiment of the present invention. Although the present embodiment discloses a digital photographing apparatus, the present invention is not limited thereto, and the present invention may be applied to any of various digital apparatuses capable of capturing motion pictures, e.g., a personal digital assistant (PDA), a mobile phone, or the like.

The digital photographing apparatus 1 includes imaging optics 101 having a zoom lens location detecting unit 103, a lens driving unit 105, a focus lens location detecting unit 106, an iris driving unit 108, a lens control unit 110, and a lens mount 109.

The imaging optics 101 includes a zoom lens 102 for zoom adjustment, a focus lens 104 for changing focus, and an iris 107. Each of the zoom lens 102 and the focus lens 104 may be a lens group including a plurality of lenses.

The zoom lens location detecting unit 103 and the focus lens location detecting unit 106 detect locations of the zoom lens 102 and the focus lens 104, respectively. A timing to detect a location of the focus lens 104 may be set by the lens control unit 110 or a camera control unit 209 to be described below. For example, a location of the focus lens 104 may be detected at a timing at which auto-focus (AF) is detected from an image signal.

The lens driving unit 105 and the iris driving unit 108 are controlled by the lens control unit 110 to drive the focus lens 102 and 104 and the iris 107, respectively. Especially, the lens driving unit 105 moves the focus lens 104 along an optical axis.

The lens control unit 110 transmits information regarding a detected location of the focus lens 104 to a main body unit 200. Here, the lens control unit 110 may transmit the information regarding a detected location of the focus lens 104 to the main body unit 200 when there is a change in a location of the focus lens 104 or when the camera control unit 209 requests information regarding a location of the focus lens 104.

The lens mount 109 includes lens-side communication pins combined with a camera-side communication pin to form a path for transmitting data or control signals.

The main body unit 200 may include an electronic viewfinder (EVF) 201, a shutter 203, an imaging device 204, an imaging device control unit 205, a display unit 206, operating buttons 207, the camera control unit 209, and a camera mount 208.

The EVF 201 includes a liquid crystal display (LCD) unit 202, and thus an image to be captured may be viewed in real-time during a photographing operation.

The shutter 203 determines a period of time during which light is applied to the imaging device 204, that is, an exposure time.

The imaging device 204 generates image signals using light that has passed through the imaging optics 101 of the lens 100. The imaging device 204 may include a plurality of photoelectric converting units arranged in a matrix form and vertical and/or horizontal transmission paths that read out the image signals by moving charges from the photoelectric converting units. The imaging device 204 may be a charge-coupled device (CCD) sensor or a complementary metal-oxide semiconductor (CMOS) sensor.

The imaging device control unit 205 generates a timing signal and controls the imaging device 204 to form an image in synchronization with the timing signal. Furthermore, the imaging device control unit 205 sequentially reads out horizontal image signals after charges are accumulated in each scanline. During the reading out operation, the horizontal image signals are used by the camera control unit 209 to detect AF.

The display unit 206 displays various images and information. The display unit 206 may be an organic light emitting display (OLED) device.

The operating buttons 207 are a unit with which a user inputs various instructions to operate the digital photographing apparatus 1. The operating buttons 207 may include various buttons, such as a shutter release button, a main switch, a mode dial, and a menu button.

The camera control unit 209 calculates a focus evaluation value by performing AF detection with respect to image signals generated by the imaging device 204. Furthermore, the camera control unit 209 records focus evaluation values for each time point according to timing signals generated by the imaging device control unit 205 and calculates a focus location by using information regarding locations of lenses transmitted from the lens 100 and the recorded focus evaluation values. A result of the calculation is transmitted to the lens 100.

The camera mount 208 includes camera-side communication pins.

Hereinafter, operations of the lens 100 and the main body 200 will be described.

When an object is to be photographed, the main switch from among the operating buttons 207 is pressed to initiate operations of the digital photographing apparatus 1. The digital photographing apparatus 1 then displays live-view images as described below.

Light from the object passed through the imaging optics 101 is incident on the imaging device 204. Here, the shutter 203 is open. The incident light is converted into electric signals by the imaging device 204, and thus image signals are generated. The imaging device 204 operates according to a timing signal generated by the imaging device control unit 205. The generated image signals corresponding to the object are converted to displayable data by the camera control unit 209 and are output to the EVF 201 and the display unit 206. This series of operations constitute a live-view image displaying process, and live-view images displayed via the live-view image displaying process may be successively displayed as a motion picture.

After the live-view image displaying process, if the shutter release button from among the operating buttons 207 is half-pressed, the digital photographing apparatus 1 initiates focus adjustment. The focus adjustment is performed by using the image signals generated by the imaging device 204. In a contrast AF method, a focus location is calculated by using a focus evaluation value related to a contrast value, and the lens 100 is moved according to a result of the calculation. The focus evaluation value is calculated by the camera control unit 209. The camera control unit 209 calculates information for controlling the focus lens 104 based on the focus evaluation value, and the information is transmitted to the lens control unit 110 via the communication pins arranged on the lens mount 109 and the camera mount 208.

The lens control unit 110 performs focus adjustment by controlling the lens driving unit 105 according to received information and moving the focus lens 104 along the optical axis. A location of the focus lens 104 is monitored by the focus lens location detecting unit 106, and thus feedback control may be performed.

When the zoom lens 102 is operated by a user and is zoomed, the zoom lens location detecting unit 103 detects a location of the zoom lens 102, and the lens control unit 110 changes parameters for controlling AF of the focus lens 104 and performs AF again.

When an image of an object is focused after the operations described above, if the shutter release button is fully pressed (S2), the digital photographing apparatus 1 performs exposure. Here, the camera control unit 209 fully closes the shutter 203 and transmits photometric data acquired hitherto to the lens control unit 110 as iris control information. The lens control unit 110 controls the iris control unit 108 according to the iris control information and appropriately adjusts an aperture of the iris 107. The camera control unit 209 captures the image of the object by controlling the shutter 203 according to the photometric data and opening the shutter 204 for an appropriate exposure time.

Figure 3:
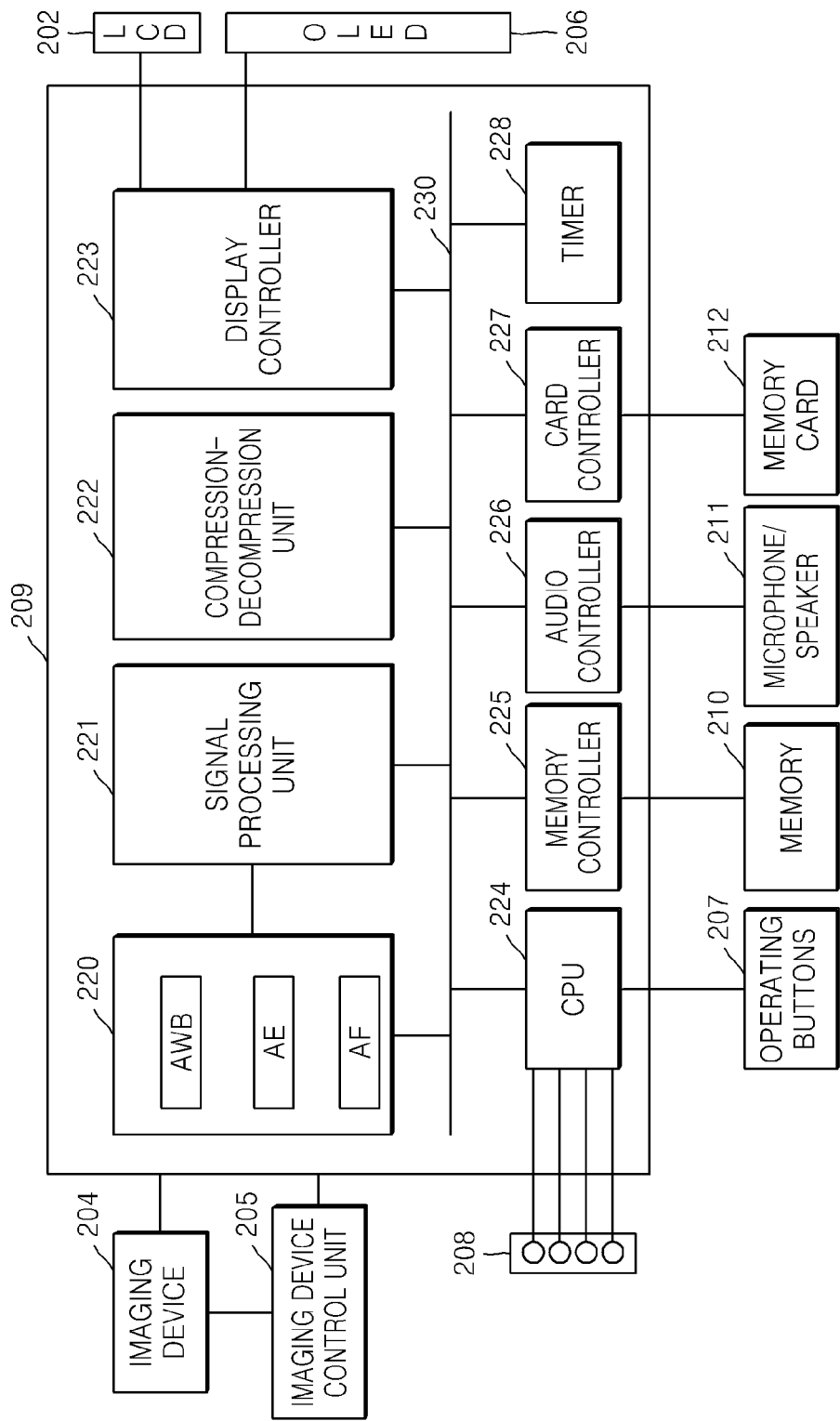
FIG. 3 is a block diagram for describing a camera control unit shown in FIG. 1 in closer detail.

The captured image is written to a memory card 212 shown in FIG. 3 after image processing and compression are performed. At the same time, the captured image is output to the EVF 201 and the display unit 206. The displayed images are referred to as quick view images.

Accordingly, a series of photographing operations are performed.

Figure 2:
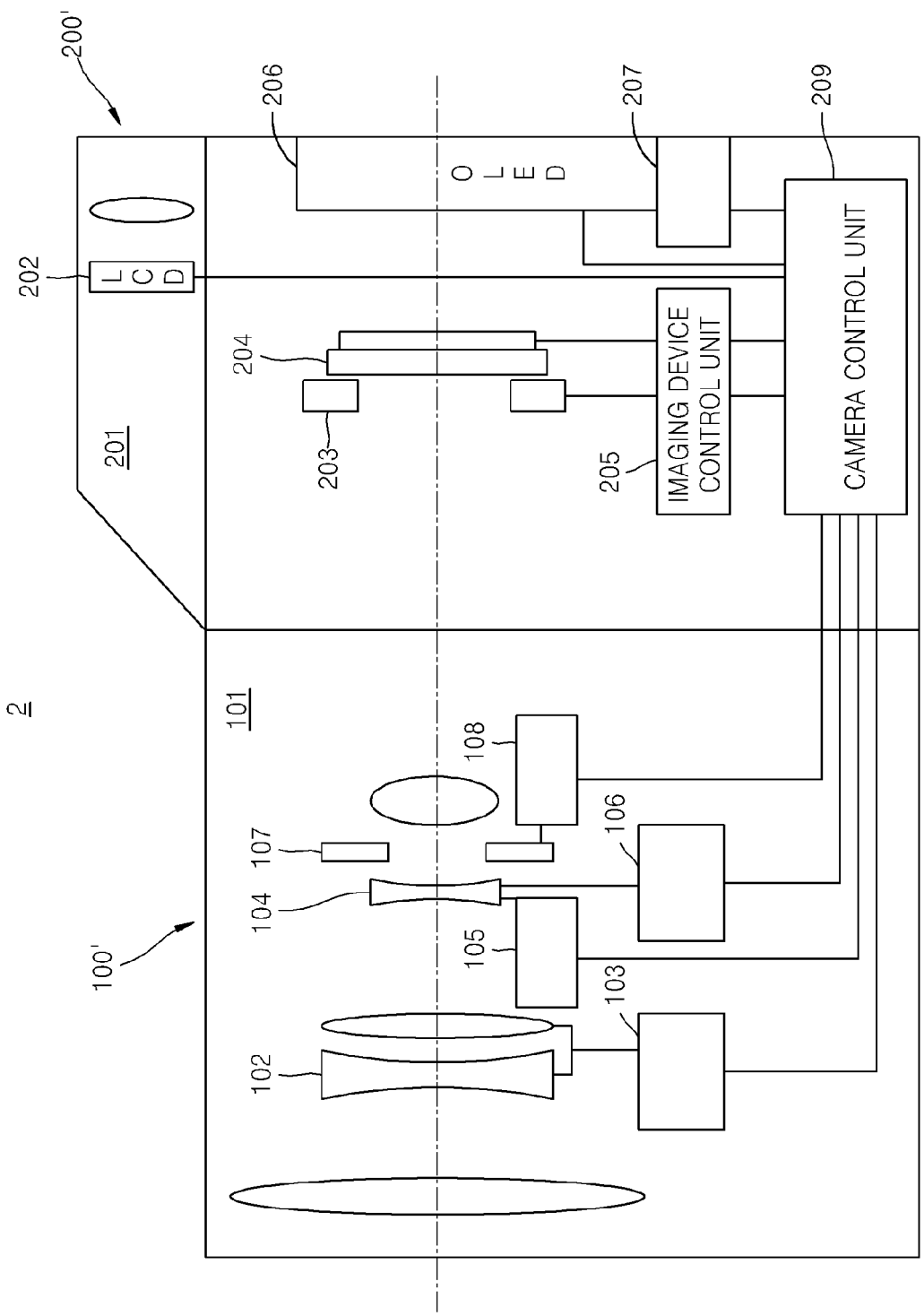
FIG. 2 is a block pictorial diagram of a lens-integrated digital photographing apparatus according to another embodiment of the present invention.

FIG. 2 is a diagram of a lens-integrated digital photographing apparatus 2 according to another embodiment of the present invention. Configuration and functions of the digital photographing apparatus 2 according to the present embodiment are similar to those of the digital photographing apparatus 1 shown in FIG. 1. Therefore, descriptions given below will focus on differences between the digital photographing apparatus 1 and the digital photographing apparatus 2.

In the digital photographing apparatus 2 according to the present embodiment, a lens 100' and a main body 200' are integrated to a single body, and thus the lens 100' cannot be exchanged. Furthermore, since the lens 100' and the main body 200' are integrated to a single body, the digital photographing apparatus 2 does not include the lens mount 109 and the camera mount 208 as shown in FIG. 1. Therefore, a camera control unit 209 moves the zoom lens 102, the focus lens 104, and the iris 107 by directly controlling the lens driving unit 105 and the iris driving unit 108. Furthermore, the camera control unit 209' directly receives information regarding locations of lenses from the zoom lens location detecting unit 103 and the focus lens location detecting unit 106. In other words, the camera control unit 209' according to the present embodiment also functions as the lens control unit 110 of FIG. 1.

The components shown in FIG. 2 indicated by the same reference numerals as the components shown in FIG. 1 are identical to the corresponding components shown in FIG. 1, and thus detailed descriptions thereof will be omitted.

FIG. 3 is a block diagram for describing the camera control unit 209 shown in FIG. 1 in closer detail. FIG. 3 also shows blocks connected to the camera control unit 209. Although descriptions are given on the camera control unit 209 shown in FIG. 1 in the present embodiment, the present embodiment is not limited thereto, and the present embodiment may be applied to the camera control unit 209' shown in FIG. 2.

Referring to FIG. 3, the camera control unit 209 according to the present embodiment may include a pre-processing unit 220, a signal processing unit 221, a compression-decompression unit 222, a display controller 223, a CPU 224, a memory controller 225, an audio controller 226, a card controller 227, a timer 228, and a main bus 230.

The camera control unit 209 provides various instructions and data to each of various components via the main bus 230.

The pre-processing unit 220 receives image signals generated by the imaging device 204 and performs calculations for auto white balance (AWB), auto exposure (AE), and auto focus (AF). In other words, the pre-processing unit 220 calculates a focus evaluation value for adjusting focus, an AE evaluation value for adjusting exposure, and an AWB evaluation value for adjusting white balance.

The signal processing unit 221 performs a series of image signal processes, such as gamma correction, and generates live-view images or a captured image to be displayed on the display unit 206.

The compression-decompression unit 222 performs compression and decompression of image signals on which image signal processes are performed. In case of compression, image signals are compressed in a compression format, such as JPEG compression format or H.264 compression format. An image file including image data generated by the compression process is transmitted to the memory card 212 and is recorded thereto.

The display controller 223 controls image display on a display screen, such as the LCD unit 202 of the EVF 201 or the display unit 206.

The CPU 224 controls overall operations of each of various components. Furthermore, in case of the digital photographing apparatus 1 as shown in FIG. 1, the CPU 224 communicates with the lens control unit 110.

The memory controller 225 controls a memory 210 for temporarily storing a captured image or calculated information.

In a snap motion picture capturing mode, motion pictures are successively captured and only a portion of the motion pictures corresponding to a predetermined short period of time may be stored in a memory. A motion picture capturing operation begins before the shutter release button is fully pressed (S2), and, when the shutter button is fully pressed (S2), motion picture data subsequently recorded may be stored in the memory card 212 as a captured motion picture.

The audio controller 226 controls a microphone or speaker 211. Furthermore, the card controller 227 controls the memory card 212 to which captured images are recorded.

The timer 228 measures time.

Hereinafter, overall operations of the camera control unit 209 will be described.

When the CPU 224 detects operation of the operating buttons 207, the CPU 224 operates the imaging device control unit 205 via the pre-processing unit 220. The imaging device control unit 205 outputs a timing signal and operates the imaging device 204. When image signals are input to the pre-processing unit 220 by the imaging device 204, calculations for AWB and AE are performed. Results of the calculations for AWB and AE are fed back to the imaging device control unit 205, so that image signals with appropriate color outputs and appropriate exposures may be acquired from the imaging device 204.

When operations of the digital photographing apparatus 1 begin, live-view images are displayed. The pre-processing unit 221 may calculate values, such as AE evaluation values, according to image signals captured at appropriate exposures input to the pre-processing unit 221. Image signals for displaying a live-view image are directly applied to the signal processing unit 221 and not via the main bus 230, and image signal processes, such as interpolation of pixels, may be performed thereon. Image signals on which image signal processes are performed are displayed on the LCD unit 202 and the display unit 206 via the main bus 230 and the display controller 223. Live-view images may be updated at a rate of 60 frames per second (fps), but the present invention is not limited thereto, and live-view images may be updated at any of rates of 120 fps, 180 fps, 240 fps, etc. The updating rate is set by the CPU 224 based on a result of photometry or AF conditions, and live-view images may be updated as the imaging device control unit 205 changes a timing signal.

When the shutter release button is half-pressed (S1), the CPU 224 detects a signal indicating that the shutter release button is half-pressed (S1) and instructs the lens control unit 110 to begin moving the focus lens 104 for an AF operation via the communication pins arranged on the camera mount 208 and the lens mount 109. Alternatively, when the CPU 224 detects a signal indicating that the shutter release button is half-pressed (S1), the CPU 224 directly controls movement of the focus lens 104 for an AF operation. In other words, the CPU 224 may be an example of a main control unit.

The CPU 224 acquires image signals from the imaging device 204, and the pre-processing unit 220 calculates a focus evaluation value. The focus evaluation value is calculated based on movement of the focus lens 104. For example, a location of the focus lens 104 at which contrast of an object image is maximum is calculated based on change of a focus evaluation value, and the focus lens 104 is moved to the calculated location. The series of operations stated above constitute an AF operation, where live-view images are continuously displayed during an AF operation. Image signals used for live-view images and image signals used for calculation of a focus evaluation value may be the same.

Furthermore, according to photographing modes, such as motion picture pre-capturing mode, an AF operation is performed continuously after a photographing mode is set and before the shutter release button is half-pressed (S1). The reason for starting an AF operation in advance is to maintain a correctly-focused state before the shutter release button is fully pressed (S2), so that a motion picture captured before the shutter release button is fully pressed is correctly focused.

Figure 4:
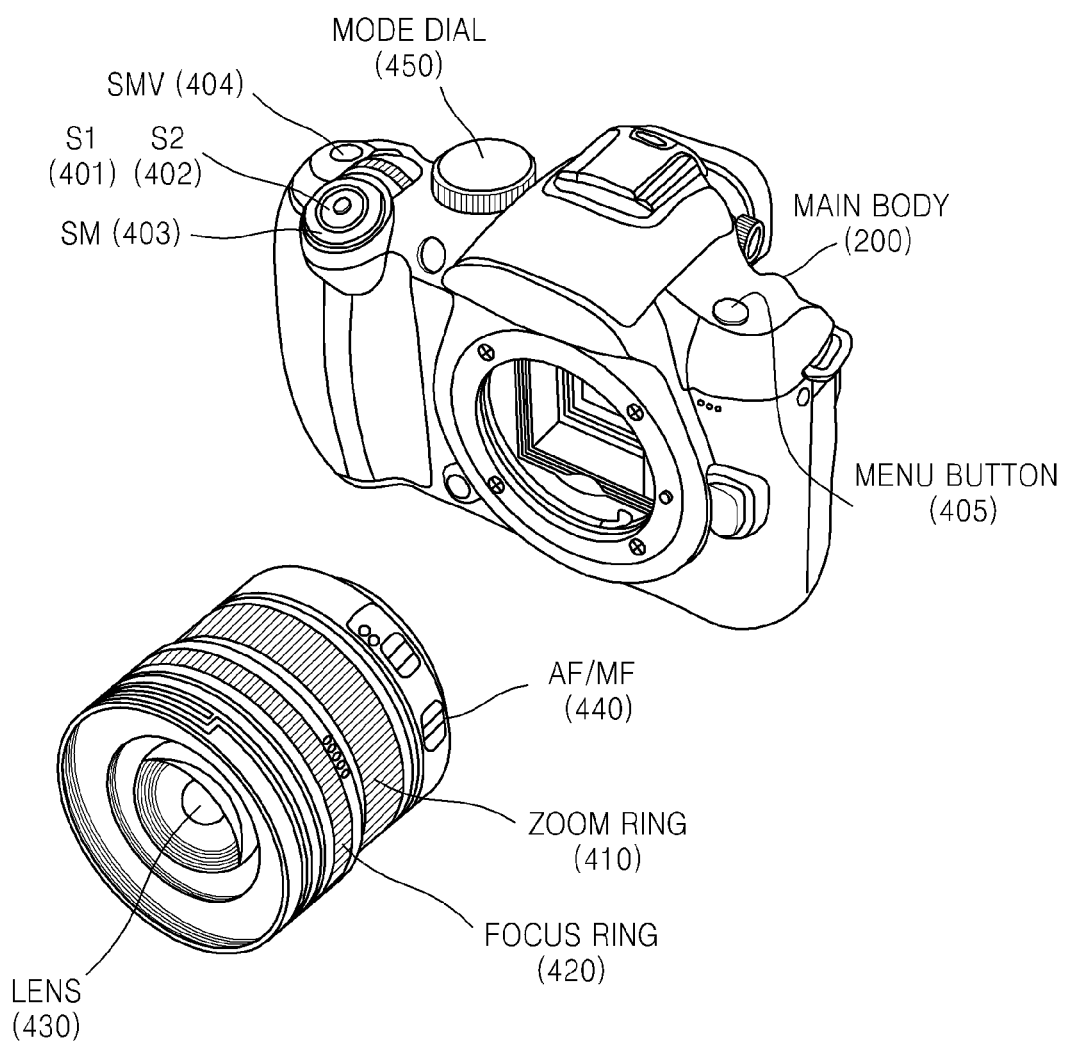
FIG. 4 is a perspective diagram for describing operating buttons as shown in FIG. 3.

FIG. 4 is a diagram for describing the operating buttons 207 as shown in FIG. 3.

FIG. 4 shows each of various buttons constituting the operating buttons 207. A shutter release button that may be in a state S1 401 or a state S2 402, a main switch (SM) 403, a motion picture capture button (SMV) 404, a menu button 405 for setting a mode, and a mode dial 450 for switching to a still image capturing mode, a motion picture capturing mode, a snap motion picture capturing mode, or the like are arranged on the main body 200. An optical lens 430, a zoom ring 410 for changing focus length, a focus ring 420 for manual focusing, and an AF/MF mode switch 440 for switching to autofocus (AF) or manual focus (MF) are arranged on the exchangeable lens unit 100. Although not shown in FIG. 4, the EVF 201 and the OLED unit 206 are arranged on a rear side of the main body 200.

General operations of a digital photographing apparatus as a camera using the operating buttons 207 will be described below. Operations of the camera begin as the main switch 403 is switched on. The camera displays live-view images. When a user operates the zoom ring 410, the zoom lens 102 moves. Furthermore, when the focus ring 420 is operated, the location detecting unit 106 connected to the focus lens 104 detects a location of the focus ring 420, and the lens control unit 110 relocates the focus lens 104 according to the detected location or a speed of the focus lens 104. When a user fully presses the shutter release button (S2), the camera performs still image exposure or motion picture exposure for a predetermined short period of time. Captured images are stored in a memory card. At the same time, the captured images are displayed on the EVF 201 and the OLED unit 206 (quick view). Accordingly, a series of photographing operations is completed.

Embodiment 1

Figure 6:
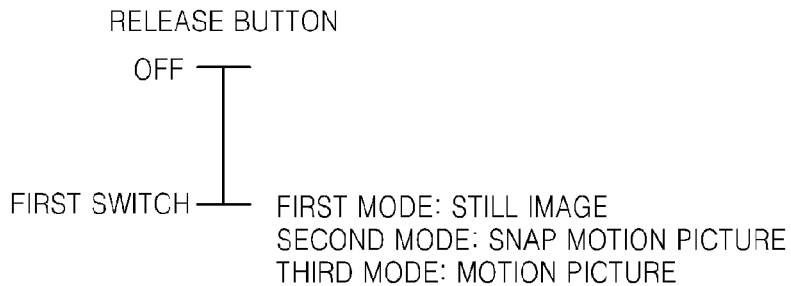
FIGS. 6 through 9 are diagrams showing switches for capturing a snap motion picture according to an embodiment of the present invention.

Operations of a digital photographing apparatus according to a first embodiment of the present invention will be described below with reference to FIGS. 14 through 22B. The digital photographing apparatus according to the present embodiment is operated by operation of a button as shown in FIG. 6. The digital photographing apparatus performs a photographing operation as the shutter release button is fully pressed S2. In detail, the digital photographing apparatus performs a still image capturing operation in a first photographing mode, snap motion picture capturing operation in a second photographing mode, and motion picture capturing operation in a third photographing mode.

In embodiments as described below, a camera is used as an example of digital photographing apparatuses, but the present invention is not limited thereto. The term "motion picture for a predetermined short period of time" is identical to the term "snap motion picture," and shall be understood as a relatively short motion picture, e.g., a motion picture having a length of about one second to about three minutes, as compared to general motion pictures.

Figure 14:
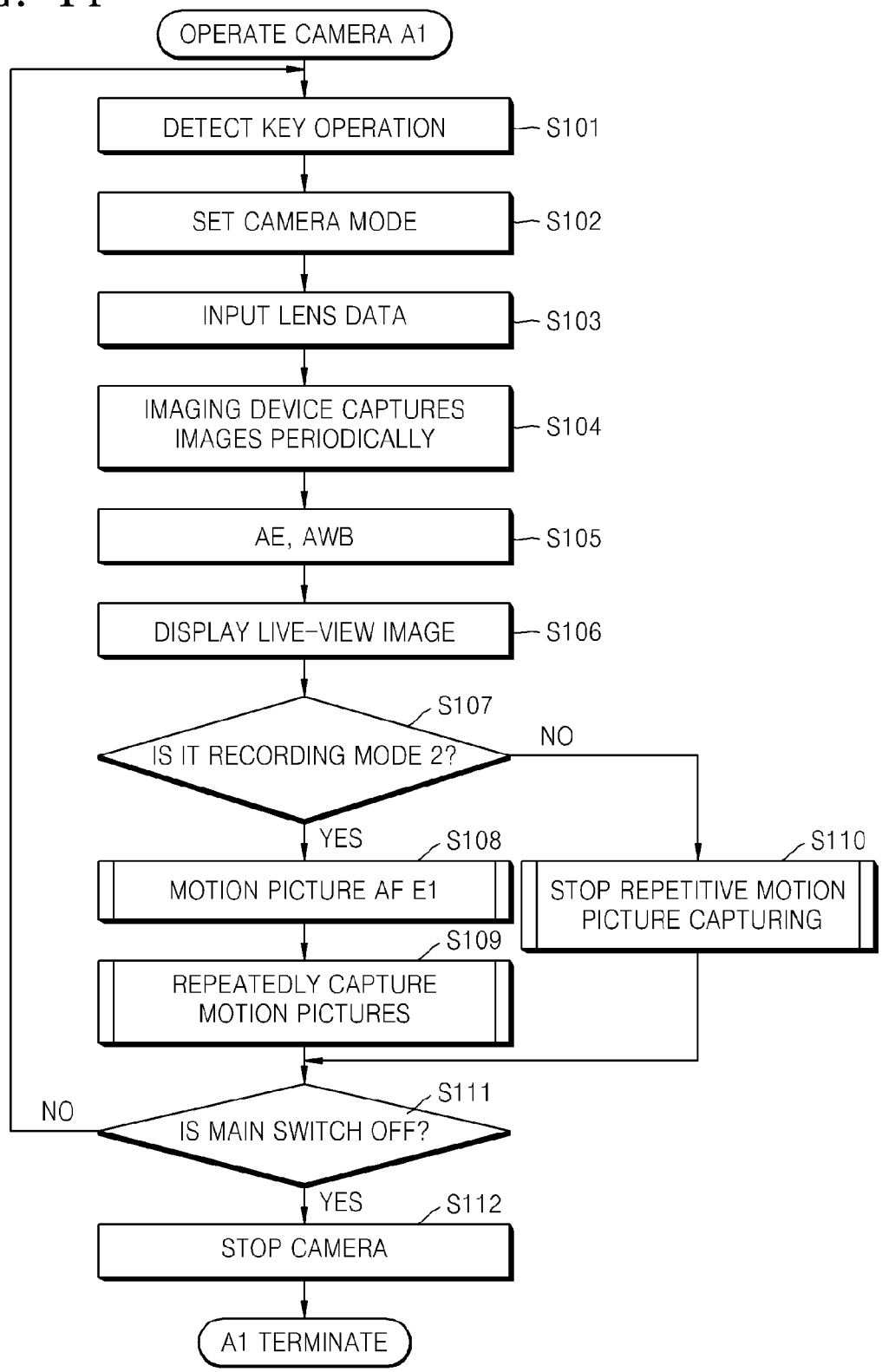
FIGS. 14 through 22B are flowcharts for describing a first embodiment of the present invention.

An operation A1 of the camera shown in FIG. 14 is an operation of starting up the camera. When the main switch 403 of the camera is turned on and the camera starts up, operation of a button is detected (operation S101). Here, the operation of a button includes operation of a mode dial. In an operation S102, an AF mode is selected, and one of various photographing modes, including a still image capturing mode, a snap motion picture capturing mode, and a motion picture capturing mode, is selected. At the same time, options provided in a menu may be selected. The options may include whether to perform voice recording, and whether to perform pre-recording or post-recording, or preset time for capturing a snap motion picture or a commemorative motion picture. In an operation S103, lens information required for operating the camera is input from the exchangeable lens unit 100. Here, the lens information refers to unique parameters of each of lenses stored in a lens memory 112 within the lens control unit 110, for example, information required for AF, AE, AWB, and quality control.

In an operation S104, an imaging device periodically performs imaging. In an operation S105, photometry is performed, and AE calculation and AWB calculation are performed based on a result of the photometry. Next, live-view images are displayed in an operation S106. Although the operations S104 through S106 are sequentially described, the steps may be simultaneously performed as image information is input from the imaging device. Next, in an operation S107, it is determined whether the camera is in a second recording mode.

Figure 10:
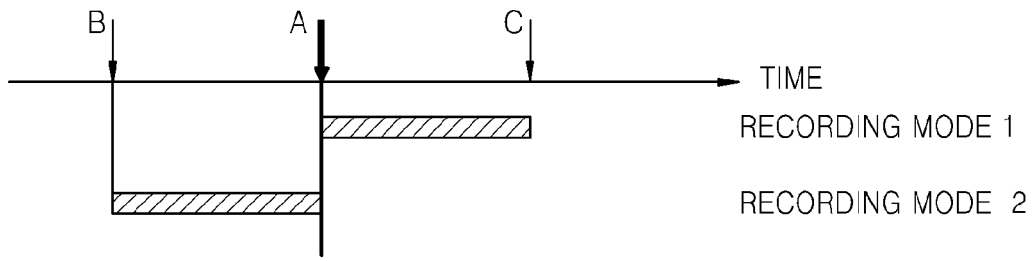
FIGS. 10 through 12 are timing diagrams for describing snap motion picture capturing modes according to an embodiment of the present invention.

Here, the second recording mode and a first recording mode are described with reference to FIG. 10. A state in which the shutter release button is fully pressed (S2) will be referred to as the switch 1. The A horizontal axis indicates lapse of time. At a time point A at which (the shutter release button is fully pressed (S2) and at which) image capturing and recording start, the switch 1 or a switch 2 performs its function. Here, a snap motion picture is to be captured for a predetermined short period of time, e.g., three seconds, and there may be two modes for capturing snap motion pictures that differ according to timings for starting and ending motion picture capture, that is, the first recording mode for capturing a motion picture for three seconds after the shutter release button is fully pressed and the second recording mode for capturing a motion picture for three seconds before the shutter release button is fully pressed. In the second recording mode, it is necessary to repeatedly capture motion pictures for three seconds continuously before the shutter release button is fully pressed. The continuous capturing may be configured to start when the second recording mode is selected. Furthermore, the predetermined short period of time may be set in advance to be, e.g., within one second to three minutes.

In the operation S107, if the camera is currently in the second recording mode, the process proceeds to an operation S108 and motion picture AF (E1) begins. Details of the motion picture AF (E1) will be described below. Next, motion pictures are repeatedly captured in an operation S109. In the operation S107, if the first recording mode is the current recording mode, the process proceeds to an operation S110 and an operation for repeatedly capturing motion pictures is terminated.

In an operation S111, it is determined whether the main switch 403 is turned off, and, if it is determined that the main switch 403 is not turned off, the process proceeds back to the operation S101 and live-view images are displayed again. If it is determined that the main switch 403 is turned off, the operation A1 of the camera is stopped in an operation S112.

Figure 15:
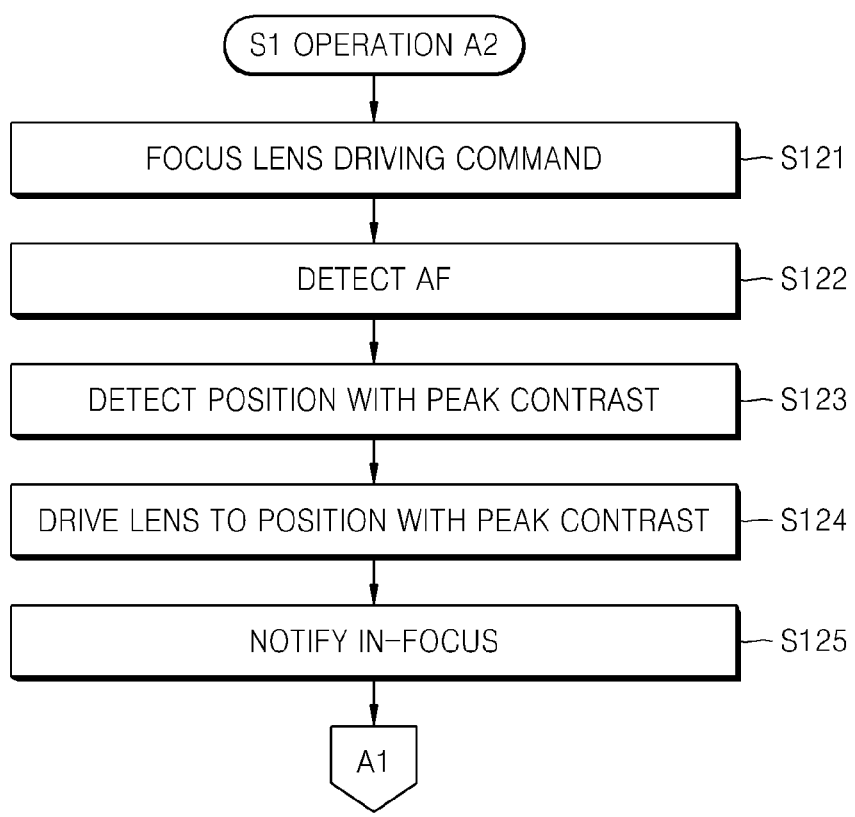

Next, if the shutter release button is half-pressed (S1) while live-view images are being displayed, an operation S1 (A2) of FIG. 15 is initiated.

Referring to FIG. 15, in an operation S121, an instruction for moving a focus lens is issued. The lens control unit 110 moves the focus lens at a predetermined speed for performing AF. Next, in an operation S122, AF detection using horizontal scanlines is performed by inputting an image corresponding to a region for focus detection to an AF detecting circuit of the pre-processing unit 220 in the lens control unit 110. In an operation S123, a location corresponding to peak contrast is detected during movement of the lens and the lens is moved to the location. When the lens is located at the location, the lens is in focus. Then the camera is notified that the lens is in focus in an operation S125. Then, the process proceeds back to the operation A1 shown in FIG. 14, and live-view images are displayed again.

Figure 16:
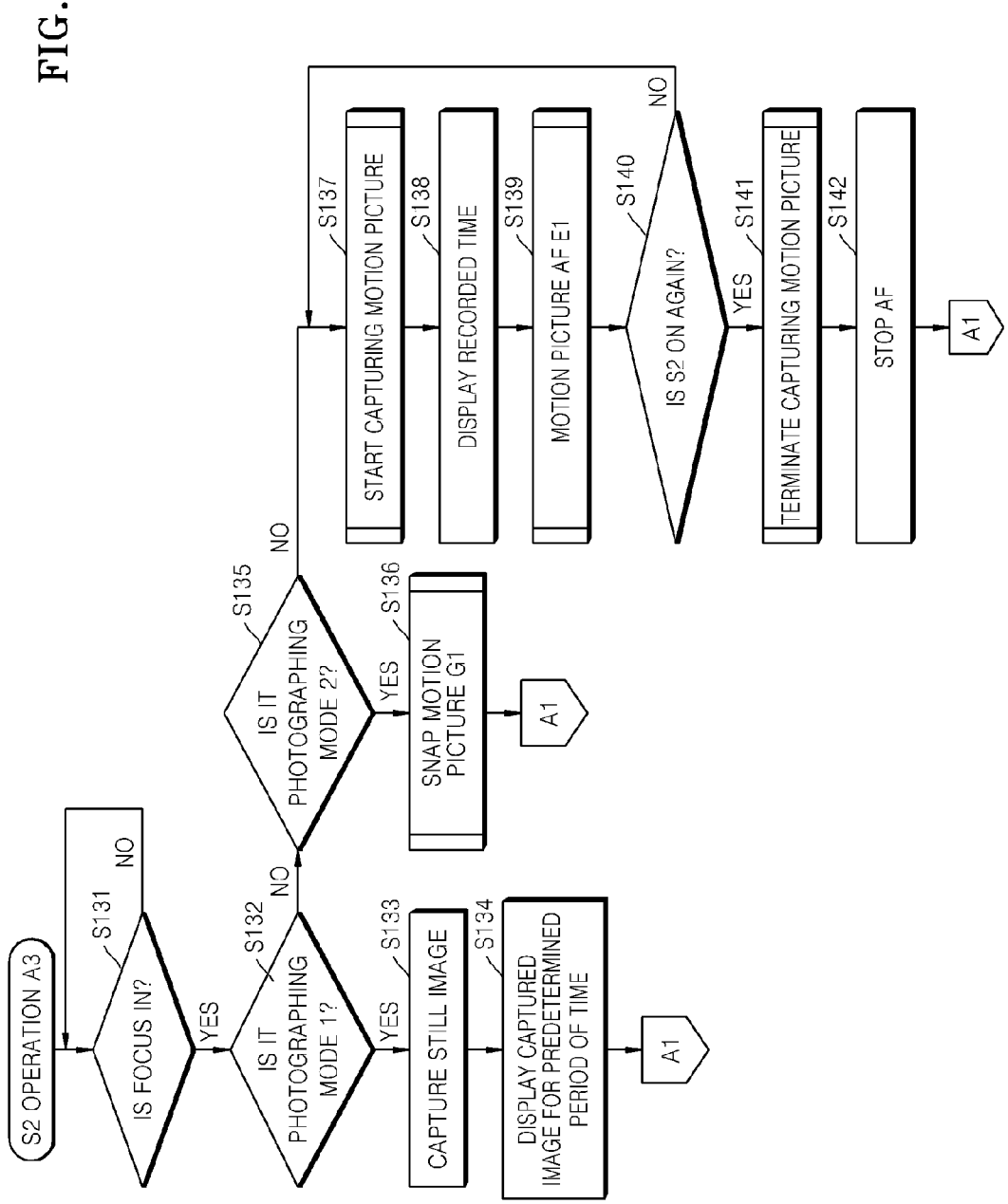

While live-view images are being displayed after AF, if the shutter release button is fully pressed (S2), an operation S2 (A3) as shown in FIG. 16 is initiated.

Referring to FIG. 16, in an operation S131, if the shutter release button is fully pressed (S2) before a lens is in focus, the process waits until the lens is in focus, and, after the lens is in focus, the process proceeds to an operation S132 and a current photographing mode is determined. If the current photographing mode is determined to be the first photographing mode, the process proceeds to an operation S133 and a still picture is captured. Next, in an operation S133, a captured image is displayed on the OLED unit 206 or the LCD unit 202 for a predetermined period of time, e.g., 5 seconds. Next, the process proceeds back to the operation A1 of FIG. 14, and live-view images are displayed again.

In the operation S132, if the current photographing mode is not the first photographing mode, it is determined whether the current photographing mode is the second photographing mode, and, if the current photographing mode is determined to be the second photographing mode, a snap motion picture operation G1 is initiated. Details of the snap motion picture operation G1 are described below. Next, the process proceeds back to the operation A1. In an operation S135, if the current photographing mode is not the second photographing mode and is the third photographing mode, the process proceeds to an operation S137 and general motion picture capturing is initiated. In an operation S138, a time at which motion picture capturing is initiated is displayed when the motion picture capturing is initiated, and the motion picture AF (E1) is initiated in an operation S139. In an operation S140, if the shutter release button is fully pressed again (S2), the process proceeds to an operation S141. However, if the shutter release button is not fully pressed, the process proceeds back to the operation S137 and motion picture capturing continues. In the operation S141, motion picture capturing is stopped. Here, an AF operation is also stopped in an operation S142, and the process proceeds back to the operation A1.

Figure 13:
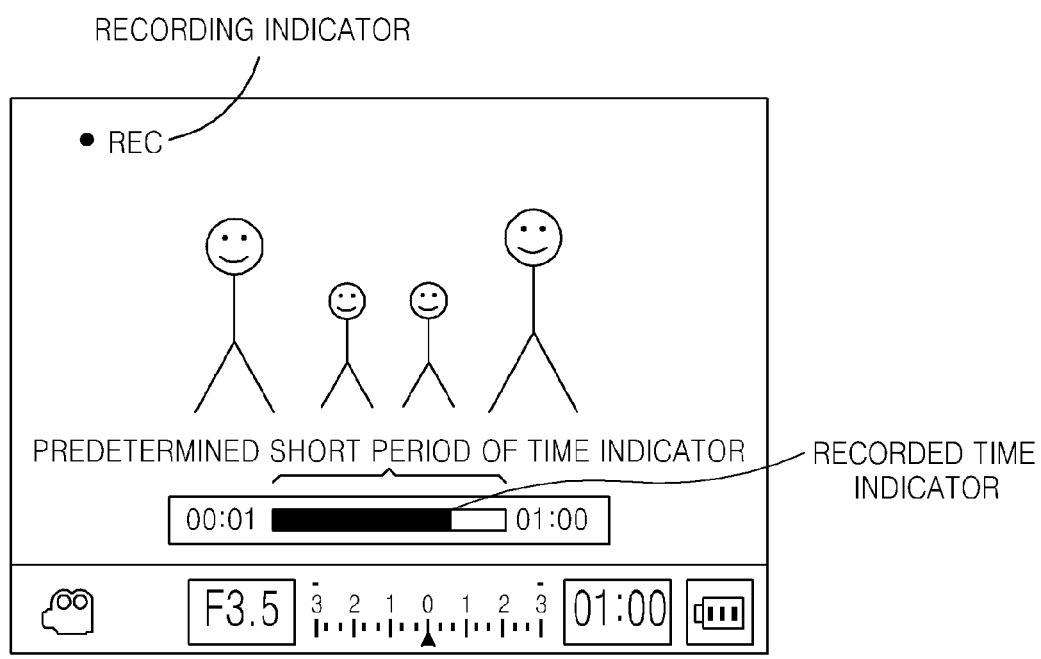
FIG. 13 is a pictorial diagram for describing a screen displayed while a snap motion picture is being captured according to an embodiment of the present invention.
Figure 17:
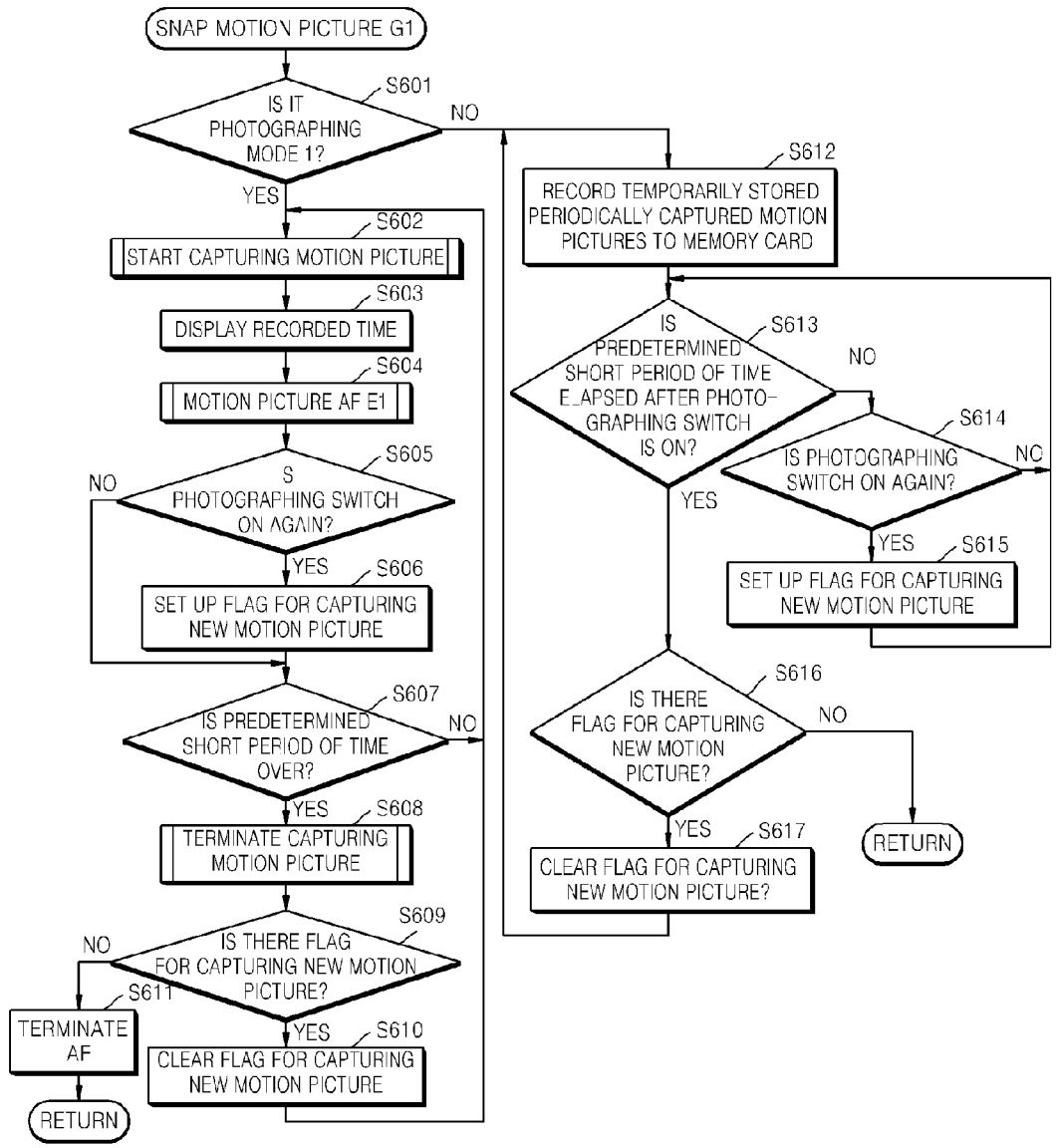

FIG. 17 shows a subroutine of the snap motion picture operation G1. In an operation S601, the current recording mode, as described with reference to FIG. 10, is determined. If the current recording mode is the first recording mode, the process proceeds to an operation S602 and a subroutine for initiating a motion picture capture is executed. In an operation S603, a motion picture capturing time is displayed. Referring to FIG. 13, when a motion picture capture is initiated, a recording indication REC is displayed, and a bar graph for showing a predetermined short period of time for capturing motion picture as configured in a menu and a recording time referring to a period of time during which a motion picture has been captured. Since a camera is to be pointed to an object while a motion picture is being captured, such information is displayed to a user.

Next, in an operation S604, the motion picture AF (E1) is initiated. Next, in an operation S605, it is determined whether the shutter release button is fully pressed (S2) again. Detailed descriptions thereof will be given below with reference to FIG. 11.

Figure 11:
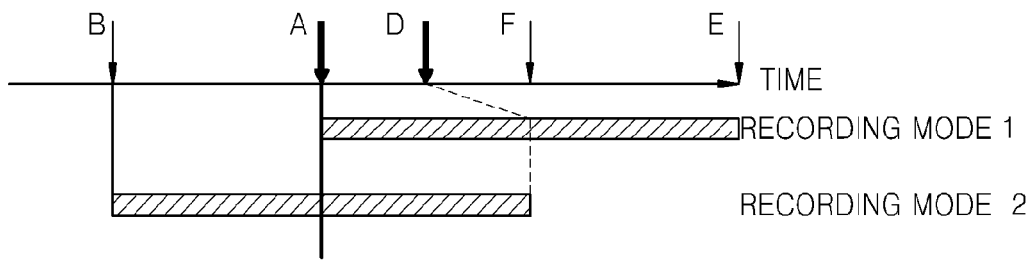

FIG. 11 shows a case where the shutter release button is fully pressed (S2) again while a snap motion picture is being captured, where a horizontal axis indicates lapse of time. The state in which the shutter release button is fully pressed (S2) will be referred to as the switch 1. The switch 1 or a switch 2 performs its function at a time point A at which an operation of capturing the snap motion picture is initiated. A time point F indicates a time point at which the operation of capturing the snap motion picture is terminated, but FIG. 11 shows that the first switch (the shutter release button) or the second switch (the motion picture capture button) is pressed at a time point D between the time points A and F. In case of the first recording mode, after the operation of capturing the snap motion picture is terminated, an operation of capturing a snap motion picture is initiated again from the time point F and is terminated at a time point E. In other words, if the shutter release button is fully pressed while a snap motion picture is being captured, when the operation of capturing the snap motion picture is terminated, a new operation of capturing a snap motion picture is initiated.

Therefore, if the shutter release button is fully pressed again in the operation S605, a flag for performing a new operation of capturing a snap motion picture is set in an operation S606. If the shutter release button is not fully pressed again in the operation S605, the process proceeds to an operation S607. In the operation S607, it is determined whether a predetermined short period of time has ended. If it is determined that the predetermined short period of time has not ended, the process proceeds back to the operation S602 to continue to capture a motion picture. If it is determined that the predetermined short period of time has ended, the operation of capturing a motion picture is terminated in an operation S608. Next, in an operation S609, it is determined whether a flag for performing a new operation of capturing a snap motion picture is set. If the flag for performing a new operation of capturing a snap motion picture is set, the process proceeds to an operation S610, the flag for performing a new operation of capturing a snap motion picture is cleared, and the process proceeds back to the operation S602 to start capturing a next snap motion picture.

However, if the shutter release button is fully pressed again while a snap motion picture is being captured, a plurality of snap motion pictures are captured. In the operation S609, if the flag for performing a new operation of capturing a snap motion picture is not set, the process proceeds to an operation S611, in which AF is stopped and the snap motion picture operation G1 is terminated.

On the other hand, in the operation S601, if the current recording mode is the second recording mode, the process proceeds to an operation S612. In the second recording mode, the operation S109 of FIG. 14 is performed and an operation of capturing a motion picture is initiated. In the operation S612 of FIG. 17, when the shutter release button is fully pressed (S2), periodically captured motion pictures stored in a temporary storage are recorded to a memory card. Next, in an operation S613, it is determined whether a predetermined short period of time has passed since the shutter release button was fully pressed. If it is determined that the predetermined short period of time has not passed since the shutter release button was fully pressed, it is determined again whether the shutter release button is fully pressed in an operation S614. In detail, a snap motion picture is temporarily stored from a time point B in FIGS. 10 through 12, that is, a predetermined short period of time before the shutter release button is fully pressed, and periodically captured motion pictures stored in the temporary storage are recorded to the memory card when the shutter release button is fully pressed (S2). Furthermore, when the shutter release button is fully pressed at the time point D prior to the time point F, at which the predetermined short period of time has passed since the time Point A, the periodically captured motion pictures stored in the temporary storage from the time point A are recorded to the memory card after the time point F. For example, if the predetermined short period of time is three seconds, when the shutter release button is fully pressed (S2) within three seconds, that is, a time from initiation of capturing a motion picture prior to capturing of a snap motion picture, two snap motion pictures are recorded to the memory card three seconds after the time point A.

Therefore, in the operation S614, if the shutter release button is fully pressed again, a flag for performing a new operation of capturing a snap motion picture is set in an operation S615, and then the process proceeds back to the operation S613. In the operation S613, when the predetermined short period of time has passed since the shutter release button was fully pressed, it is determined whether the flag for performing a new operation of capturing a snap motion picture is set. If the flag for performing a new operation of capturing a snap motion picture is set, the flag for performing a new operation of capturing a snap motion picture is cleared, the process proceeds back to the operation S612, and two snap motion pictures are captured. In an operation S616, if the flag for performing a new operation of capturing snap a motion picture is not set, the snap motion picture operation G1 is terminated.

Figure 12:
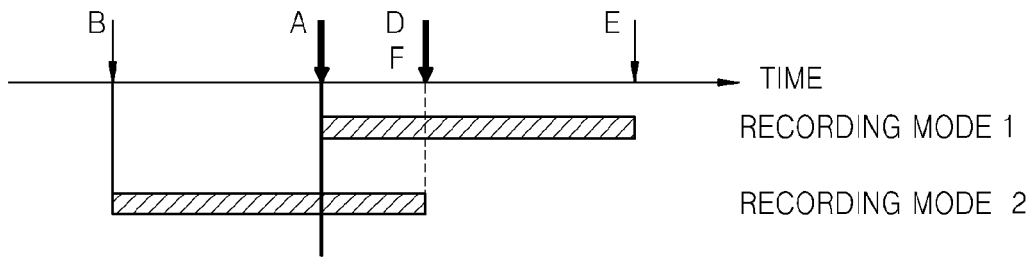

FIG. 12 shows a snap motion picture operation (G2) according to another embodiment of the present invention. Differences between the snap motion picture operation G1 and the snap motion picture operation G2 will be described below with reference to FIG. 12. Similar to FIG. 11, the state in which the shutter release button is fully pressed (S2) will be referred to as the switch 1. The switch 1 or a switch 2 performs its function at a time point A, at which an operation of capturing a snap motion picture is initiated. In case of the first recording mode, if at a time point D the shutter release button is fully pressed while a snap motion picture is being captured, the current operation of capturing a snap motion picture is terminated. Next, an operation of capturing snap motion picture is initiated again from the time point D and is terminated at a time point E. In other words, if at a time point the shutter release button is fully pressed while a snap motion picture is being captured, the operation of capturing the snap motion picture is terminated and an operation of capturing a new snap motion picture is initiated from the time point at which the shutter release button is fully pressed. Alternatively, when the shutter release button is fully pressed at the time point D during capturing of a snap motion picture, a snap motion picture may be captured as an extension of an already captured snap motion picture for the predetermined short period of time, and the operation of capturing the snap motion picture may be terminated at the time point E.

In case of the second recording mode, a snap motion picture captured from a time point B, that is, a time point the predetermined short period of time before the time point A, is recorded to the memory card at the time point A, at which the shutter release button is fully pressed (S2). Furthermore, if the shutter release button is fully pressed (S2) again at the time point D, which is a time point within the predetermined short period of time from the time point A, a second snap motion picture is captured only for a time period from the time point A to the time point D. In other words, a time point F at which the operation of capturing the second snap motion picture is terminated, and the time point D are the same time point here.

Figure 18:
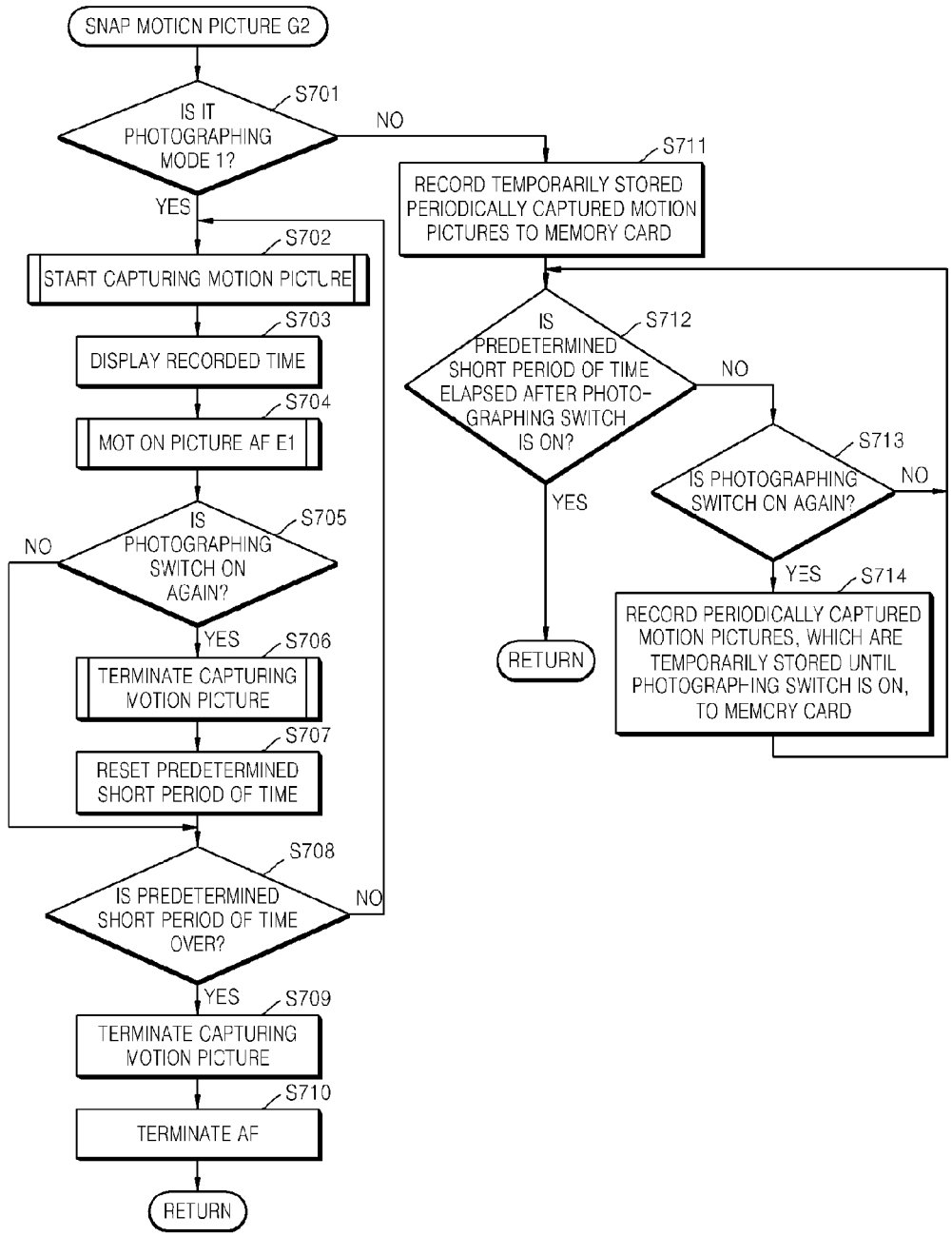

Referring to FIG. 18, in an operation S701, if it is determined that the current recording mode is the first recording mode, an operation of capturing a motion picture for a predetermined short period of time is initiated in an operation S702, a motion picture capturing time is displayed in an operation S703, the motion picture AF (E1) is initiated in an operation S704, and it is determined whether the shutter release button is fully pressed (S2) again in an operation S705. If the shutter release button is fully pressed (S2) again, the operation of capturing a motion picture is terminated in an operation S706. Next, the predetermined short period of time is reset in an operation S707. Accordingly, an operation for capturing a next snap motion picture is initiated.

In the operation S705, if the shutter release button is not fully pressed (S2) again, the operations S706 and S707 are omitted, and the process proceeds to an operation S708, in which it is determined whether the predetermined short period of time has passed. The process proceeds back to the operation S702 and the operation of capturing a motion picture is continued if the predetermined short period of time has not passed, and the operation of capturing a motion picture is terminated in an operation S709 if the predetermined short period of time has passed. Next, in an operation S710, the motion picture AF is stopped and the snap motion picture operation G2 is terminated.

Furthermore, according to another embodiment of the present invention, the operation S706 for stopping capturing of a motion picture may be omitted or an operation of capturing a snap motion picture may simply be extended.

In the operation S701, in case of the second recording mode, the process proceeds to an operation S711, and periodically captured motion pictures stored in the temporary storage are recorded to the memory card at a time point at which the shutter release button is fully pressed (S2). Next, in an operation S712, it is determined whether the predetermined short period of time has passed since the shutter release button was fully pressed. If it is determined that the predetermined short period of time has passed, the snap motion picture operation G2 is terminated. If it is determined that the predetermined short period of time has not passed since the shutter release button was fully pressed, it is determined again whether the shutter release button is fully pressed in an operation S713. If the shutter release button is not fully pressed, the process proceeds back to the operation S712. If the shutter release button is fully pressed, periodically captured motion pictures stored in the temporary storage from a previous time point, at which the shutter release button is fully pressed, to a time point, at which the shutter release button is fully pressed again, are recorded to the memory card.

Figure 19:
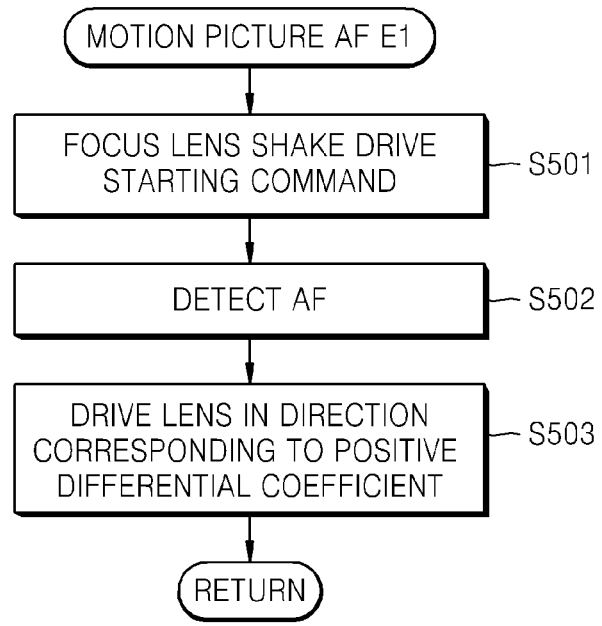

FIG. 19 shows a subroutine of the motion picture AF (E1). Referring to FIG. 19, an instruction for initiating wobbling movement of a focus lens is issued in an operation S501, and AF detection for detecting contrast is performed in an operation S502. In an operation S503, AF detection values acquired during the wobbling movement between two points are differentiated, and the focus lens is moved in a direction corresponding to a positive differential coefficient. Movement of the lens in a direction corresponding to a positive differential coefficient refers to movement of the lens in a direction along which contrast increases. The lens is in focus when a value of a differential coefficient is zero. If the value of a differential coefficient is zero, only the wobbling movement is performed. The controls as stated above belong to general methods of performing AF for capturing a motion picture, and thus detailed descriptions thereof will be omitted.

Figure 20:
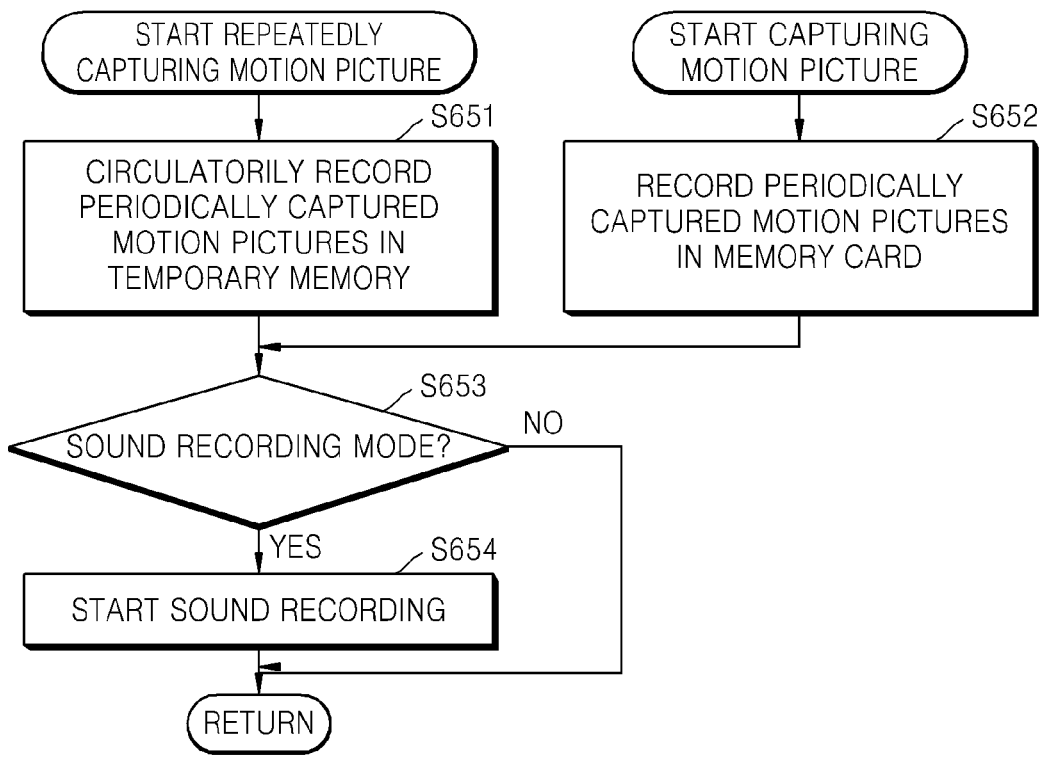

FIG. 20 shows subroutines of initiating an operation for repeatedly capturing a motion picture and initiating an operation of capturing a motion picture.

First, in case of initiating an operation for repeatedly capturing a motion picture, periodically captured motion pictures are circulatorily recorded in a temporary memory in an operation S651. Motion pictures are circulatorily stored for a time period corresponding to a predetermined short period of time set in a menu. On the other hand, in case of initiating an operation of capturing a motion picture, periodically captured motion pictures are stored in a memory card in an operation S652. Next, in an operation S653, it is determined whether a voice recording mode is set in a menu. If the voice recording mode is set, an operation of recording voice is initiated in an operation S654, and the current subroutine is terminated.

Figure 5A:
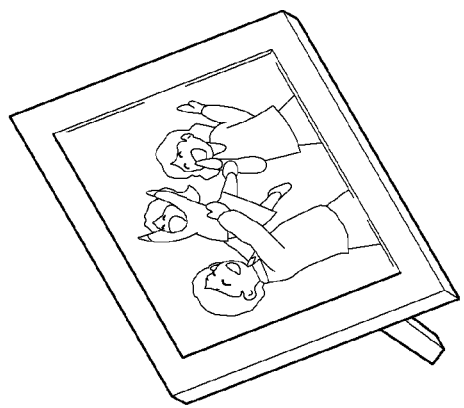
FIGS. 5A-C are pictorial diagrams showing various digital photographing apparatuses according to an embodiment of the present invention.
Figure 5B:
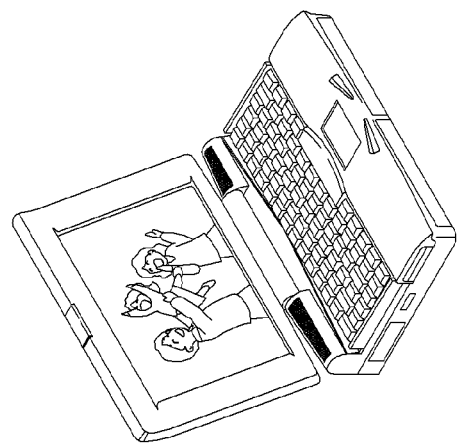
Figure 5C:
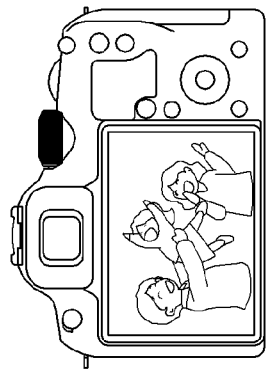
Figure 21:
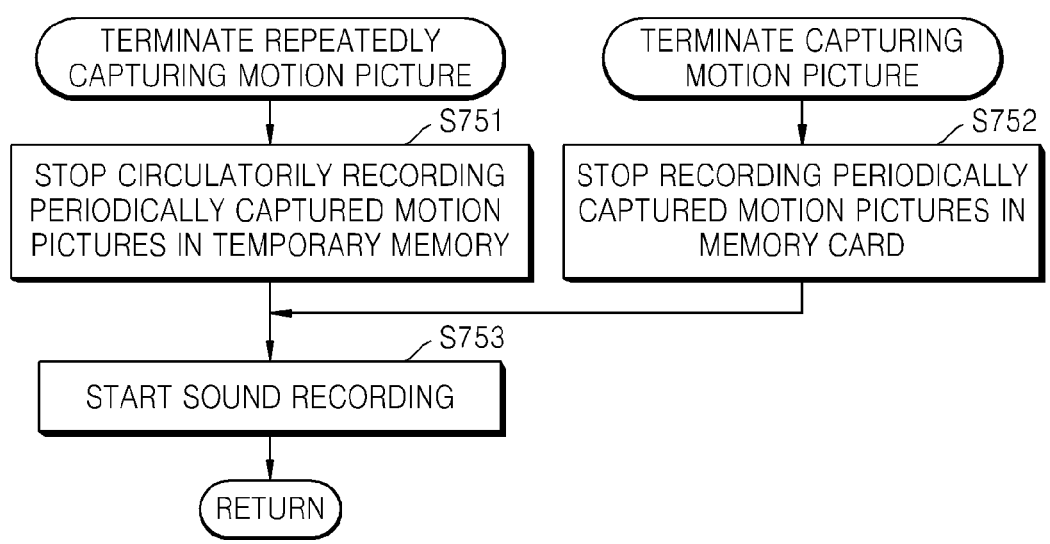
Figure 22A:
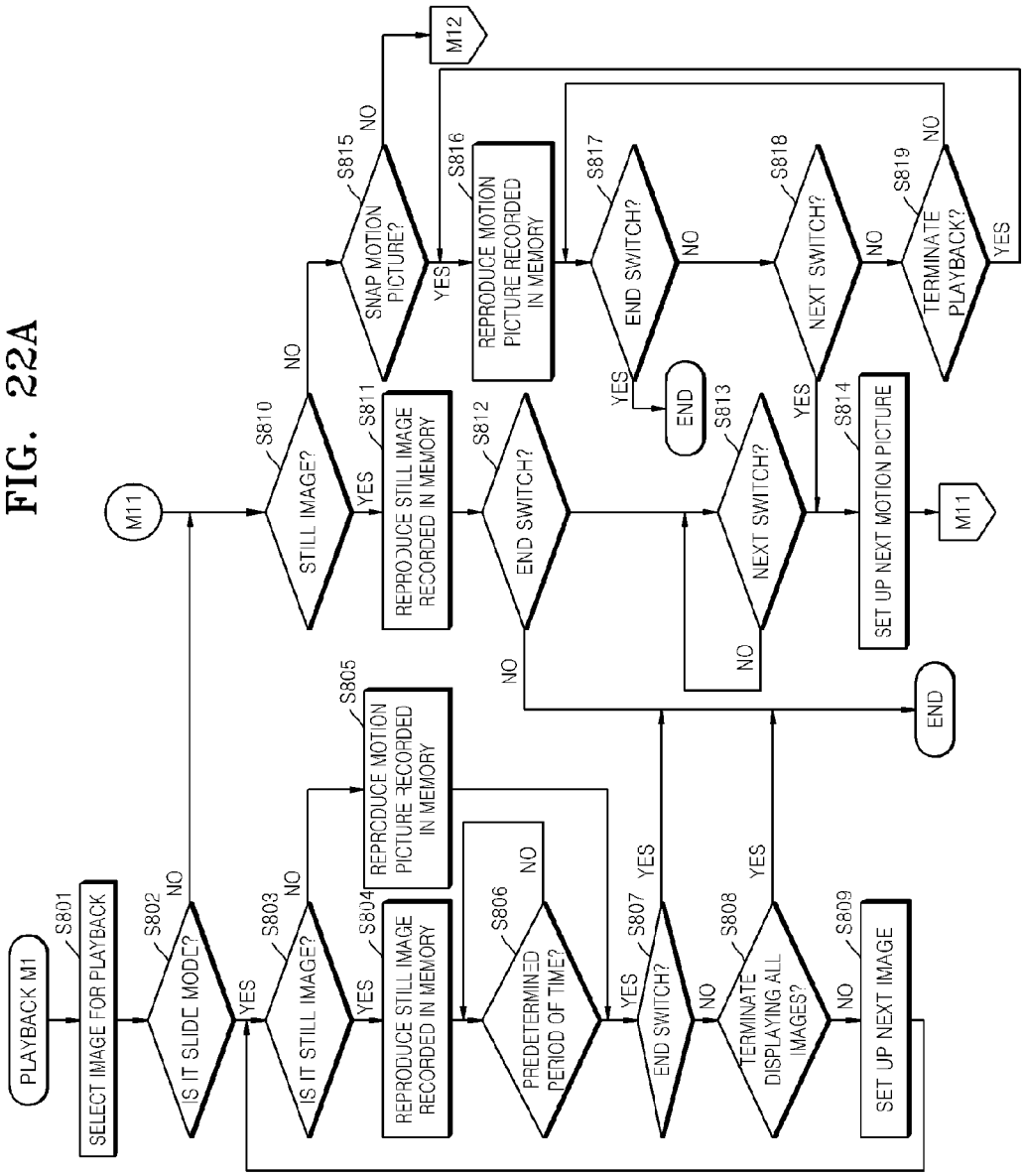
Figure 22B:
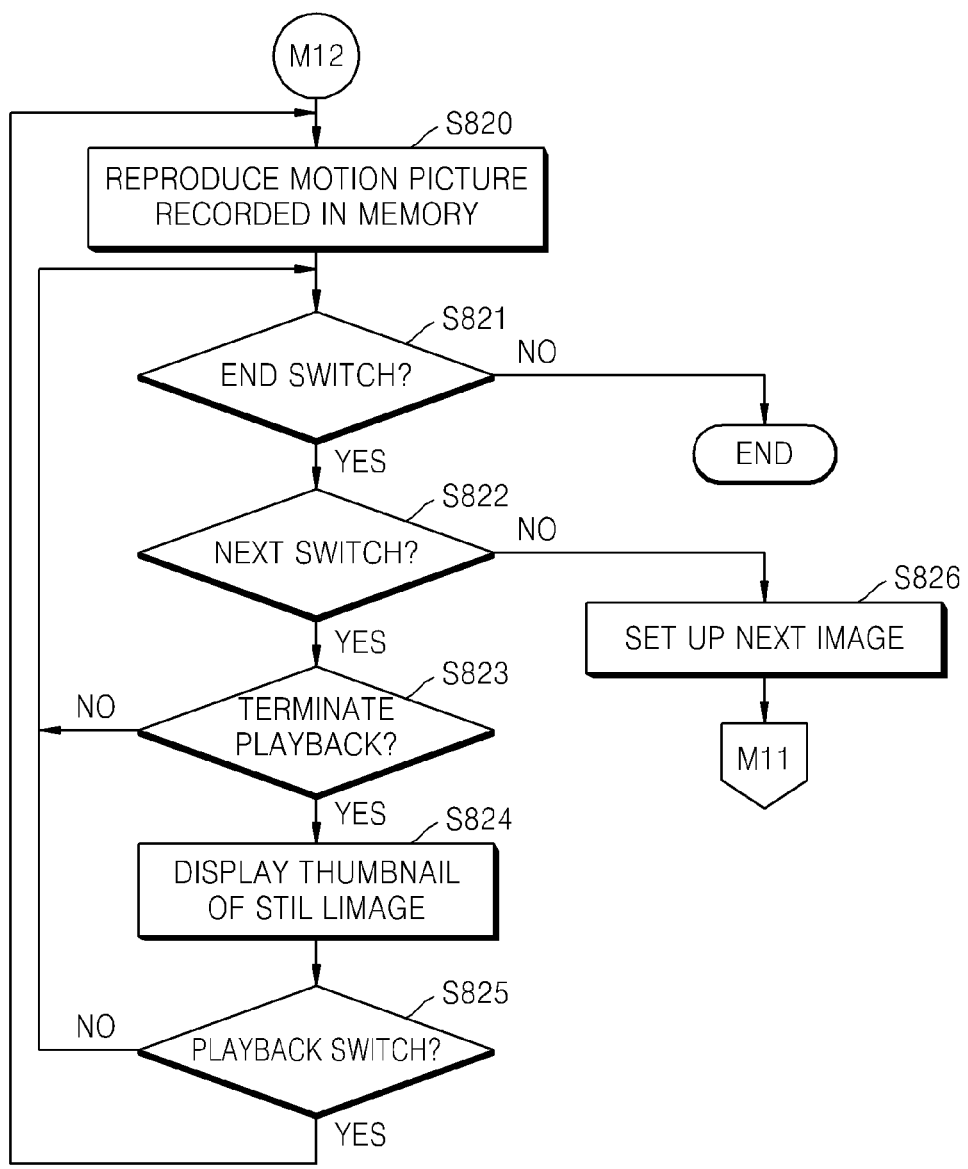

FIG. 21 shows subroutines of terminating an operation for repeatedly capturing a motion picture and terminating an operation of capturing a motion picture. In case of terminating an operation for repeatedly capturing a motion picture, a circulatory recording of periodically captured motion pictures in a temporary memory is terminated in an operation S751. On the other hand, in case of terminating an operation of capturing a motion picture, recording of periodically captured motion pictures in a memory card is terminated in an operation S752. Next, in an operation S753, the operation of recording voice is terminated, and the current subroutine is terminated. FIGS. 22A and 22B are flowcharts for describing an operation for reproducing a motion picture (W1). Motion pictures may be reproduced on a display screen of a camera as shown in FIG. 5C. Furthermore, motion pictures may be reproduced by using reproduction devices, such as a digital photo frame, a DVD player, a TV, or a PC, as shown in FIGS. 5A and 5B. Such reproduction devices may reproduce motion pictures stored in a memory attached thereto, or may receive motion pictures wirelessly and reproduce the received motion pictures.

Referring to FIG. 22A, an image to be reproduced is selected in an operation S801. Next, in an operation S802, it is determined whether continuous reproduction of images is configured, that is, whether a slideshow mode is set. The selection may be generally made at a time of reproduction. Furthermore, in case of the slideshow mode, it is determined whether the images are still images in an operation S803. If the images are still images, the images stored in a memory are reproduced as still images in an operation S804. Next, after the images are displayed for a predetermined period of time in an operation S806, the process proceeds to an operation S807.

In the operation S803, if the images are motion pictures or snap motion pictures, the process proceeds to an operation S805, and the images stored in the memory are reproduced as motion pictures. Next, the process proceeds to the operation S807, and the process is terminated if an end button is pressed. If the end button is not pressed, the process proceeds to an operation S808, in which it is determined whether the reproduction of the image is completed. If the reproduction of the image is completed, the process is terminated. If the reproduction of the image is not completed, a next image is set in an operation S809, and the process proceeds back to the operation S803 and the next image is continuously reproduced.

On the other hand, in the operation S802, if it is not the slideshow mode, a single image is reproduced. The process proceeds to an operation S810, in which it is determined whether the image is a still image. If the image is a still image, the image stored in the memory is reproduced as a still image in an operation S811. Next, in an operation S812, it is determined whether the end button is pressed. If the end button is pressed, the operation of reproducing an image is terminated. If the end button is not pressed, the process proceeds to an operation S813, in which it is determined whether a button for switching to a next screen is pressed. If the button for switching to a next screen is not pressed, the reproduction of a still image continues. If the button for switching to a next screen is pressed, the process proceeds to an operation S814, in which a next image is set, and the process proceeds back to the operation S810 and continues to reproduce the next image.

In the operation S810, if the image is not a still image, it is determined whether the image is a snap motion picture in an operation S815. If the image is a snap motion picture, the process proceeds to an operation S816, in which the image stored in the memory is reproduced as a motion picture. Next, in an operation S817, it is determined whether the end button is pressed. If the end button is pressed, the operation of reproducing an image is terminated. If the end button is not pressed, the process proceeds to an operation S818, in which it is determined whether the button for switching to a next screen is pressed. If the button for switching to a next screen is pressed, the process proceeds back to the operation S814, in which a next image is set, and the process proceeds back to the operation S810 and continues to reproduce the next image. In the operation S818, if the button for switching to a next screen is not pressed, it is determined whether reproduction of a motion picture is completed in an operation S819. If the reproduction of the motion picture is not completed, the process proceeds back to the operation S817 and continues the reproduction of the motion picture. If the reproduction of the motion picture is completed, the process proceeds to the operation S816 and reproduction of the same motion picture is initiated. Due to repeated reproduction of a single snap motion picture, the snap motion picture is displayed as a commemorative motion picture.

Referring to FIG. 22B, in the operation S815, if the image stored in the memory is a general motion picture, the process proceeds to an operation S820, in which the image stored in the memory is reproduced as a motion picture. Next, in an operation S821, it is determined whether the end button is pressed. If the end button is pressed, the operation of reproducing an image is terminated. If the end button is not pressed, the process proceeds to an operation S822, in which it is determined whether the button for switching to a next screen is pressed. If the button for switching to a next screen is pressed, the process proceeds to an operation S826, in which a next image is set, and the process proceeds back to the operation S810 and continues to reproduce the next image. If the button for switching to a next screen is not pressed in the operation S822, it is determined whether reproduction of a motion picture is completed in an operation S823. If the reproduction of the motion picture is not completed, the process proceeds back to the operation S821 and continues the reproduction of the motion picture. If the reproduction of the motion picture is completed, the process proceeds to the operation S824 and still images are displayed as thumbnail images. Furthermore, in an operation S825, if a playback button is pressed, the process proceeds back to the operation S820 and reproduction of the same motion picture is repeated. If the playback button is not pressed, the process proceeds back to the operation S821 and the process waits until a button is pressed while thumbnail images are displayed.

Embodiment 2

Figure 7:
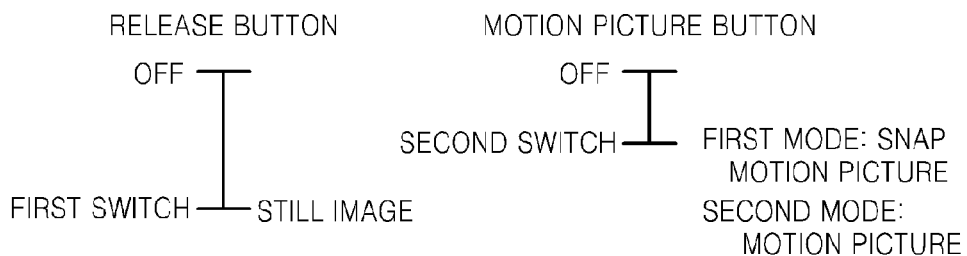

Operation of a digital photographing apparatus as a camera according to another embodiment of the present invention will be described below with reference to FIGS. 23 and 24. The camera is operated as buttons are operated as shown in FIG. 7. Referring to FIG. 7, when the shutter release button is fully pressed, a still image is captured, where a separate button is configured to capture a motion picture. There are two photographing modes, where a snap motion picture is captured in a first photographing mode, whereas a general motion picture is captured in a second photographing mode.

Here, descriptions on operations of the camera similar to those according to the previous embodiment will be omitted. The camera is started via the operation A1 as shown in FIG. 14, and, when the shutter release button is half-pressed (S1), the operation A2 as shown in FIG. 15 is performed.

Figure 23:
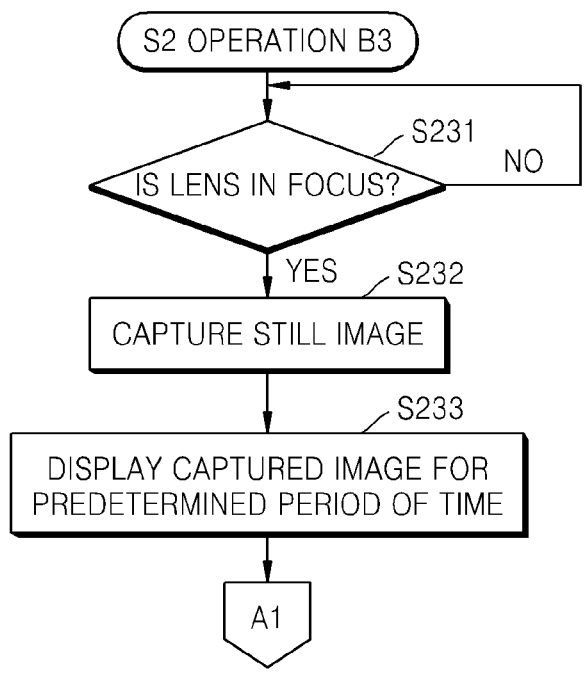
FIGS. 23 and 24 are flowcharts for describing a second embodiment of the present invention.

FIG. 23 is a flowchart of an operation B3 in the case where the shutter release button is fully pressed (S2).

Referring to FIG. 23, in an operation S231, the process waits until movement of a lens for AF, initiated when the shutter release button is half-pressed, is completed. Next, in an operation S232, a still image is captured. Next, the captured image is displayed for a predetermined period of time in an operation S233, and the process proceeds back to the operation A1 as shown in FIG. 14.

Figure 24:
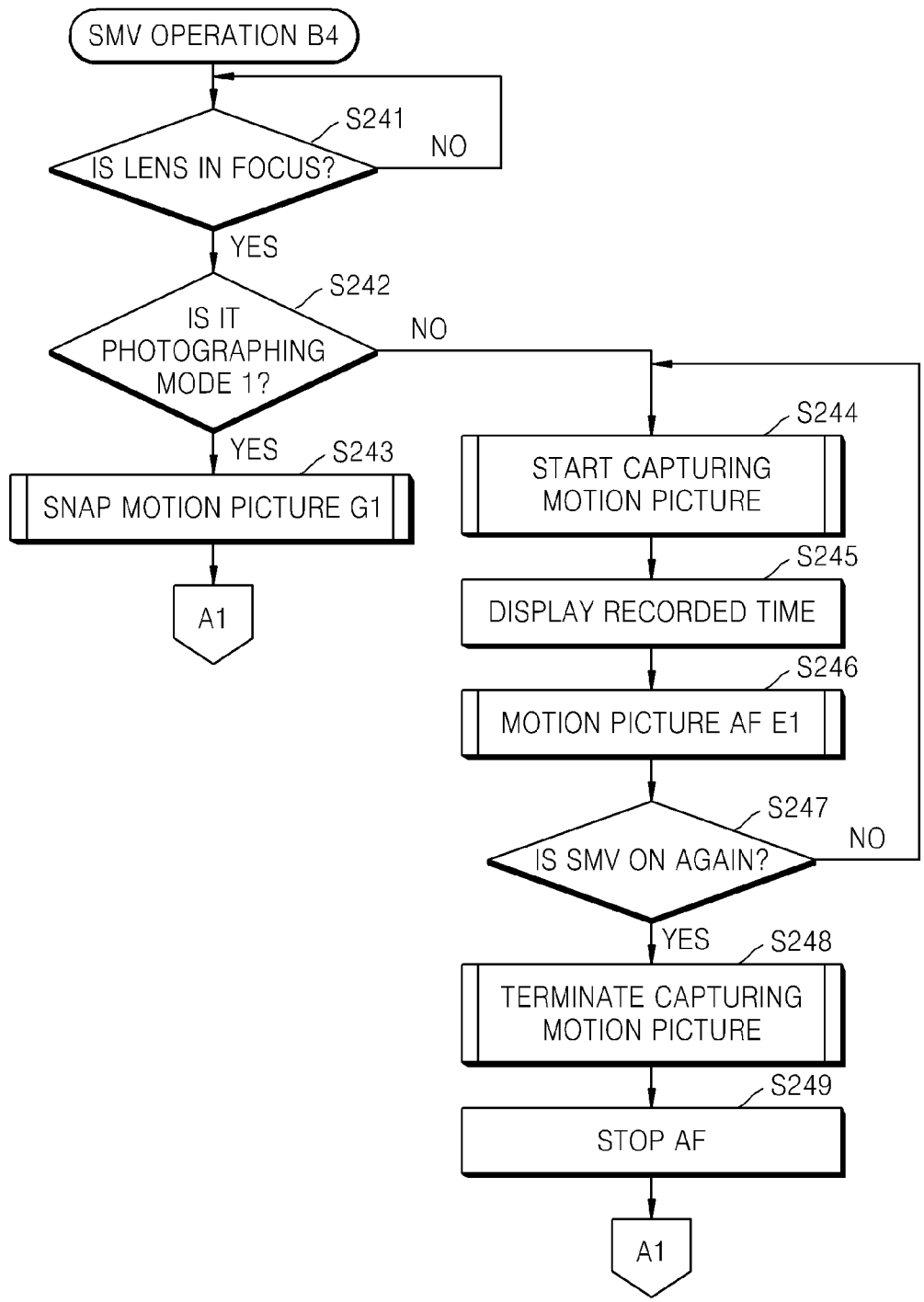

FIG. 24 shows an SMV operation (B4) in the case where a motion picture capture button (SMV) 404 is pressed. If the motion picture capture button (SMV) 404 is pressed before a lens is in focus, the process waits until the lens is in focus, and the process proceeds to an operation S242 after the lens is in focus. In the operation S242, it is determined whether the current photographing mode is the first photographing mode. If the current photographing mode is the first photographing mode, the snap motion picture operation G1 is performed in an operation S243. Details of the snap motion picture operation G1 are as described above with reference to FIG. 17. Next, the process proceeds back to the operation A1 of the camera as shown in FIG. 14.

In the operation S242, if the current photographing mode is the second photographing mode, the process proceeds to an operation S244 and an operation of capturing a general motion picture is initiated. In an operation S245, a motion picture capturing time is displayed and the motion picture AF (E1) is performed simultaneously as the operation of capturing a general motion picture is initiated. In an operation S247, it is determined again whether the motion picture capture button (SMV) 404 is pressed. If the motion picture capture button (SMV) 404 is pressed, the process proceeds to an operation S248. If the motion picture capture button (SMV) 404 is not pressed, the process proceeds back to the operation S244 and continues the operation of capturing the motion picture. The operation of capturing the motion picture is terminated in the operation S248, the AF operation is terminated in an operation S249, and the process proceeds back to the operation A1. Furthermore, subroutines of which detailed descriptions are omitted are processed in the same manner as the subroutines in the previous embodiment.

Embodiment 3

Figure 8:
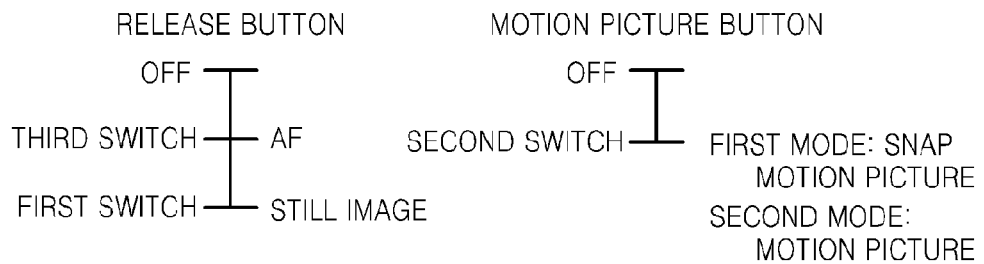

An operation of a camera according to another embodiment of the present invention will be described with reference to FIGS. 25 and 26. The operation of the camera according to the present embodiment is performed as buttons are operated as shown in FIG. 8. When the shutter release button is half-pressed, AF is performed. When the shutter release button is fully pressed, a still image is captured in case of the first photographing mode, whereas a snap motion picture is captured in case of the second photographing mode. Furthermore, a general motion picture is captured when a separate motion picture capture button is pressed.

Here, descriptions on operations of the camera similar to those according to the previous embodiments will be omitted. The camera is started via the operation A1 as shown in FIG. 14, and, when the shutter release button is half-pressed (S1), the operation A2 as shown in FIG. 15 is performed.

Figure 25:
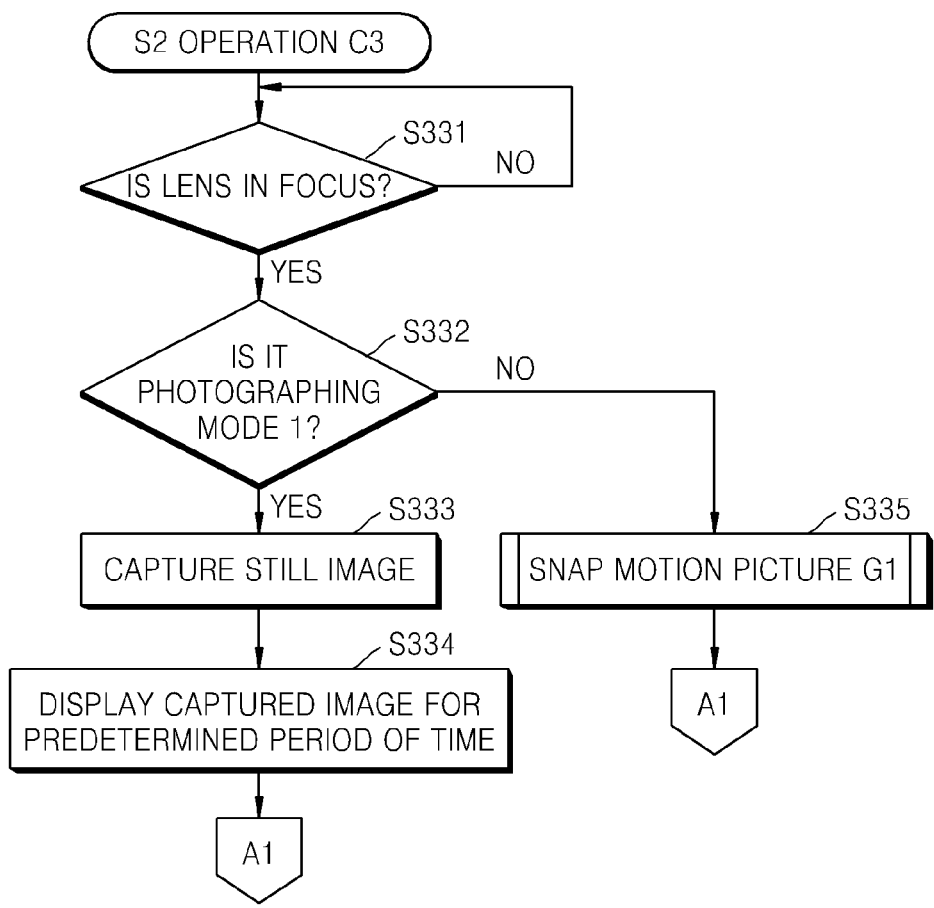
FIGS. 25 and 26 are flowcharts for describing a third embodiment of the present invention.

FIG. 25 shows an operation C3 in the case where the shutter release button is fully pressed (S2). In an operation S331, the process waits until movement of a focus lens initiated when the shutter release button is half-pressed (S1) is completed. Next, in an operation S332, it is determined whether the current photographing mode is the first photographing mode. If the current photographing mode is the first photographing mode, a still image is captured in an operation S333. Next, the captured image is displayed for a predetermined period of time in an operation S334, and the process proceeds back to the operation A1 as shown in FIG. 14.

Figure 26:
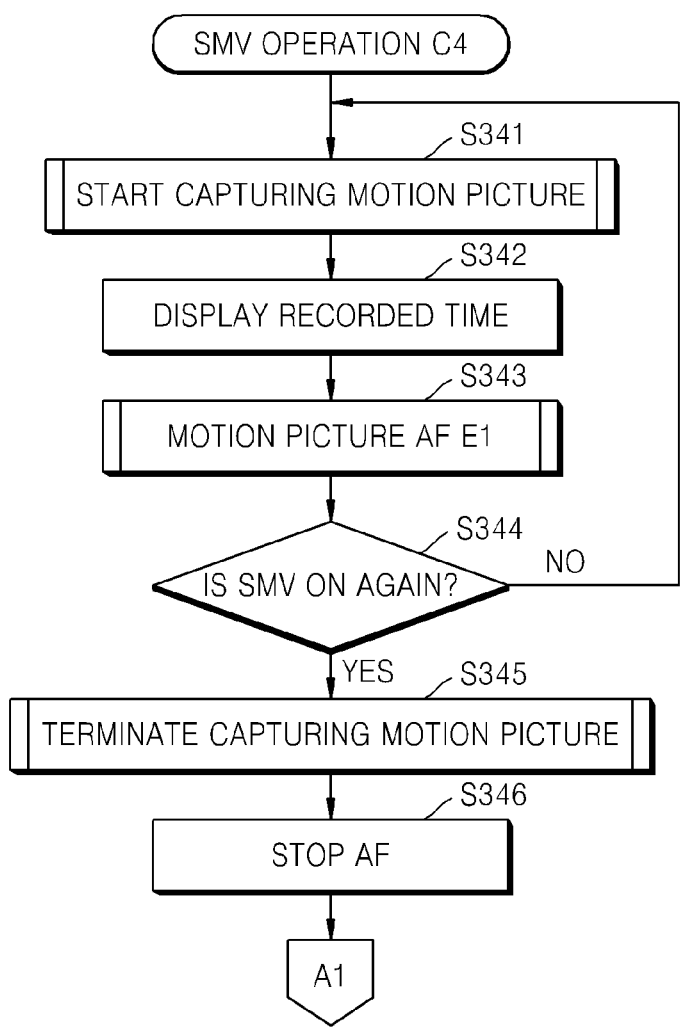

FIG. 26 shows an SMV operation (C4) in the case where the motion picture capture button (SMV) 404 is pressed, related to capturing of a general motion picture. First, in an operation S341, an operation of capturing a motion picture is initiated. In an operation S342, motion picture capturing time is displayed simultaneously as the operation of capturing a general motion picture is initiated. Next, the motion picture AF (E1) is performed in an operation S343. In an operation S344, it is determined again whether the motion picture capture button (SMV) 404 is pressed. If the motion picture capture button (SMV) 404 is pressed, the process proceeds to an operation S345. If the motion picture capture button (SMV) 404 is not pressed, the process proceeds back to the operation S341 and continues the operation of capturing the motion picture. The operation of capturing the motion picture is terminated in the operation S345, the AF operation is terminated in an operation S346, and the process proceeds back to the operation A1. Furthermore, subroutines of which detailed descriptions are omitted are processed in the same manner as the subroutines in the previous embodiment.

Embodiment 4

Figure 9:
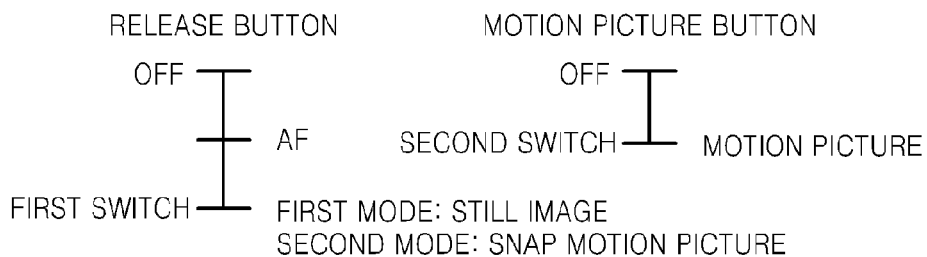

An operation of a camera according to another embodiment of the present invention will be described with reference to FIG. 27. The operation of the camera according to the present embodiment is performed as buttons are operated as shown in FIG. 9. When the shutter release button is half-pressed, AF is performed. When the shutter release button is fully pressed, a still image is captured. Furthermore, when a separate motion picture capture button is pressed, a snap motion picture is captured in case of the first photographing mode, and a general motion picture is captured in case of the second photographing mode.

Here, descriptions on operations of the camera similar to those according to the previous embodiments will be omitted. The camera is started via the operation A1 as shown in FIG. 14, and, when the shutter release button is half-pressed (S1), the operation A2 as shown in FIG. 15 is performed. When the shutter release button is fully pressed (S2), the operation B3 as shown in FIG. 23 is performed.

Figure 27:
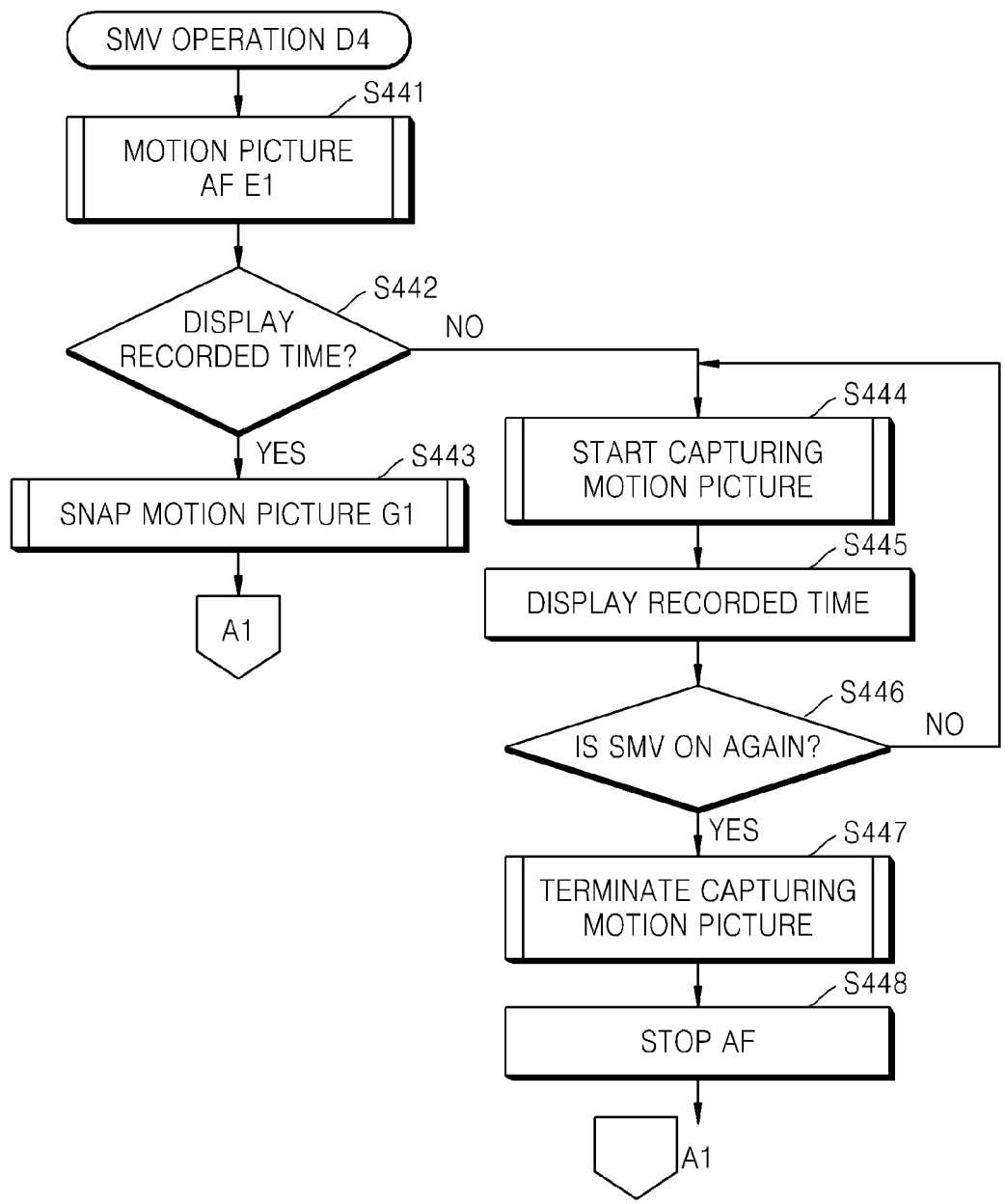
FIG. 27 is a flowchart for describing a fourth embodiment of the present invention.

FIG. 27 shows an SMV operation (D4) in the case where a motion picture capture button (SMV) 404 is pressed.

In an operation S441, the motion picture AF (E1) is initiated. Next, in an operation S442, it is determined whether the current photographing mode is the first photographing mode. If the current photographing mode is the first photographing mode, the snap motion picture operation G1 is performed in an operation S443, and the process proceeds back to the operation A1 of the camera.

In the operation S442, if the current photographing mode is not the first photographing mode, a motion picture capturing time is displayed simultaneously as the operation of capturing a general motion picture is initiated in operations S444 and S445. In an operation S446, it is determined again whether the motion picture capture button (SMV) 404 is pressed. If the motion picture capture button (SMV) 404 is pressed, the process proceeds to an operation S447. If the motion picture capture button (SMV) 404 is not pressed, the process proceeds back to the operation S444 and continues the operation of capturing the motion picture. The operation of capturing the motion picture is terminated in the operation S447, the AF operation is terminated in an operation S448, and the process proceeds back to the operation A1. Furthermore, subroutines of which detailed descriptions are omitted are processed in the same manner as the subroutines in the previous embodiment.

The device described herein may comprise a processor, a memory for storing program data and executing it, a permanent storage such as a disk drive, a communications port for handling communications with external devices, and user interface devices, including a display, keys, etc.

When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional embodiments may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional embodiments of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:
1. A digital photographing apparatus comprising:
an imaging lens via which light from an object is input; and
an imaging device for generating image signals using light passed through the imaging lens,
wherein the digital photographing apparatus starts and completes capturing of a motion picture from the image signals according to a selected photographing mode and operation of one or more predetermined switches;

wherein:
in case of a first photographing mode being selected, a still image is captured as a single predetermined switch of the one or more predetermined switches is operated,
in case of a second photographing mode being selected, the capturing of the motion picture is initiated as the single predetermined switch is operated and is automatically terminated after a first predetermined period of time has elapsed for a first recording mode,
in case of a third photographing mode being selected, the capturing of the motion picture is initiated as the single predetermined switch is pressed and is terminated as the single predetermined switch is pressed again, and
in case of the first recording mode for the second photographing mode being selected, if the single predetermined switch is pressed again during the capturing of the motion picture, then the capturing of the motion picture is i) extended after the first predetermined period of time and ii) automatically terminated after a second predetermined period of time after the first predetermined period of time.

2. The digital photographing apparatus of claim 1, wherein:
the one or more predetermined switches comprises a first switch and a second switch, and
the second switch is the single predetermined switch;
wherein, in case of the third photographing mode being selected,
a still image is captured from the image signals as the first switch is pressed,
the motion picture is captured from the image signals as the second switch is pressed, and
the capturing of the motion picture is initiated as the second switch is pressed and is automatically terminated after the first predetermined period of time has elapsed.

3. The digital photographing apparatus of claim 1, wherein, in case of a third recording mode for the second photographing mode being selected, if the single predetermined switch is pressed again during the capturing of the motion picture, then i) the capturing of the motion picture is automatically terminated after the first predetermined period of time has elapsed and ii) capturing of a new motion picture is automatically performed for a next first predetermined period of time.

4. The digital photographing apparatus of claim 1, wherein, in case of a fourth recording mode for the second photographing mode being selected, if the single predetermined switch is pressed again during the capturing of the motion picture, then i) the capturing of the motion picture is automatically terminated and ii) capturing of a new motion picture is immediately performed for a next first predetermined period of time.

5. The digital photographing apparatus of claim 1, wherein, in case of a second recording mode for the second photographing mode being selected, motion pictures are periodically captured continuously for the first predetermined period of time after the second recording mode is selected.

6. The digital photographing apparatus of claim 1, wherein the first predetermined period of time is from one second to three minutes.

7. A digital photographing apparatus comprising:
an imaging lens via which light from an object is input;
an imaging device for generating image signals using light passed through the imaging lens;
a still image capture controller for capturing a still image from the image signals;
a motion picture capture controller for capturing a motion picture by successively acquiring the image signals;
a focus adjusting unit that acquires focus detection evaluation values from the image signals and controls the imaging lens to be located at an in-focus position; and
one or more switches for performing at least one of functions including focus adjustment, still image capture, motion picture capture, and snap motion picture capture,
wherein the digital photographing apparatus starts capturing of a snap motion picture from the image signals according to a selected recording mode and operation of a single predetermined switch of the one or more switches and completes the capturing of the snap motion picture after a first period of time has elapsed, wherein the first period of time is predetermined;
wherein:
in case of a first recording mode being selected, a snap motion picture is recorded when the single predetermined switch of the one or more switches is pressed, the snap motion picture corresponding to the first period of time after the predetermined switch is pressed; and
in case of the first recording mode being selected, if the single predetermined switch is pressed again during the capturing of the snap motion picture, then the capturing of the snap motion picture is i) extended after the first predetermined period of time and ii) automatically terminated after a second predetermined period of time after the first predetermined period of time.

8. The digital photographing apparatus of claim 7, wherein:
the one or more switches comprises a first switch, a second switch, and a third switch,
capturing of the motion picture is initiated as the second switch is pressed, and is terminated as the second switch is pressed again,
in case of a first photographing mode being selected, the focus adjustment is performed as the third switch is pressed and capturing of the still image is initiated as the first switch is pressed, and
in case of a second photographing mode being selected, the focus adjustment is performed as the third switch is pressed and the capturing of the snap motion picture is initiated as the first switch is pressed, and the capturing of the snap motion picture is terminated after the first period of time has elapsed.

9. The digital photographing apparatus of claim 7, wherein:
the one or more switches comprises a first switch, a second switch, and a third switch,
the focus adjustment is performed as the third switch is pressed, the focus adjustment is terminated and the capturing of the still image is initiated as the first switch is pressed, and
the focus adjustment is performed and the capturing of the snap motion picture is initiated as the second switch is pressed, and the capturing of the snap motion picture is terminated after the first period of time has elapsed.

10. The digital photographing apparatus of claim 9, wherein:
the third switch corresponds to a shutter release switch half-pressed,
the first switch corresponds to the shutter release switch fully-pressed, and
the second switch corresponds to a motion picture capture switch.

11. The digital photographing apparatus of claim 7, wherein, in case of a third recording mode being selected, a snap motion picture is recorded when the single predetermined switch of the one or more switches is pressed, the snap motion picture corresponding to the first period of time after the predetermined switch is pressed, and if the single predetermined switch is pressed again during the capturing of the snap motion picture, the capturing of the snap motion picture is terminated after the first period of time has elapsed and capturing of a new snap motion picture is performed for a next first period of time.

12. The digital photographing apparatus of claim 7, wherein, in case of a fourth recording mode being selected, a snap motion picture is recorded when the single predetermined switch of the one or more switches is pressed, the snap motion picture corresponding to the first period of time after the predetermined switch is pressed, and if the single predetermined switch is pressed again during the capturing of the snap motion picture, the capturing of the snap motion picture is terminated and capturing of a new snap motion picture is immediately performed for a next first period of time.

13. The digital photographing apparatus of claim 7 wherein, in case of a second recording mode, snap motion pictures are periodically captured continuously for the first period of time after the second recording mode is selected.

14. The digital photographing apparatus of claim 7, wherein the focus adjustment is performed after a second recording mode is selected.

15. The digital photographing apparatus of claim 7, wherein, in case of a second recording mode, if the single predetermined switch is pressed again within a predetermined period of time after the capturing of the snap motion picture is terminated, capturing of a next snap motion picture is performed for a next first period of time after the capturing of the snap motion picture is performed from a time point at which the single predetermined switch is previously pressed.

16. The digital photographing apparatus of claim 7, wherein, in case of a second recording mode, if the single predetermined switch is pressed again within a predetermined period of time after the capturing of the snap motion picture is initiated, capturing of the snap motion picture is performed for a next third period of time as an extension of the first period of time until the switch is pressed again.

17. The digital photographing apparatus of claim 15, wherein the predetermined period of time refers to the first period of time.

18. The digital photographing apparatus of claim 16, wherein the third period of time is longer than the first period of time and is shorter than twice the first period of time.

19. The digital photographing apparatus of claim 7, wherein, in case of the first recording mode for capturing of the snap motion picture for the first period of time after the single predetermined switch is pressed, the first period of time and a portion of the first period of time in which the snap motion picture has already been captured are displayed.

20. The digital photographing apparatus of claim 7, wherein, in case of the first recording mode for capturing of the snap motion picture for the first period of time after the single predetermined switch is pressed, the focus adjustment is performed while the snap motion picture is being captured.

21. The digital photographing apparatus of claim 7, wherein the first period of time is selectable in a menu of the digital photographing apparatus.

22. The digital photographing apparatus of claim 7, wherein a voice recording option to record a voice during the capturing of the snap motion picture is configurable in a menu of the digital photographing apparatus.

23. A method of controlling a digital photographing apparatus comprising an imaging lens via which light from an object is input and an imaging device for generating image signals using light that has passed through the imaging lens, the method comprising:
  detecting, by the digital photographing apparatus, that a single predetermined switch of the digital photographing apparatus is operated;
  initiating capturing by the digital photographing apparatus of a motion picture from the image signals according to the operation of the single predetermined switch;
  capturing, by the digital photographing apparatus, the motion picture for a first predetermined period of time after the single predetermined switch is operated for a first recording mode; and
  automatically terminating, by the digital photographing apparatus, the capturing of the motion picture after the first predetermined period of time has elapsed;
  detecting, by the digital photographing apparatus, that the single predetermined switch is pressed again while the motion picture is being captured; and
  automatically terminating, by the digital photographing apparatus, the capturing of the motion picture after a second period of time as an extension of the first period of time in case of the first recording mode being selected.

24. The method of claim 23, further comprising:
  automatically terminating, by the digital photographing apparatus, the capturing of the motion picture after the first period of time has elapsed and performing capturing of a next motion picture for a next first period of time in case of a third recording mode being selected.

25. The method of claim 23, further comprising:
  automatically terminating, by the digital photographing apparatus, the capturing of the motion picture and immediately performing capturing of a motion picture for a next first period of time in case of a fourth recording mode being selected.

26. The method of claim 23, further comprising performing, by the digital photographing apparatus, focus adjustment while the motion picture is being captured.

27. The method of claim 23, wherein the first period of time is from one second to three minutes.

\* \* \* \* \*